(12) United States Patent
Wang et al.

(10) Patent No.: US 12,069,712 B2
(45) Date of Patent: Aug. 20, 2024

(54) COMMUNICATION METHOD AND APPARATUS

(71) Applicant: HUAWEI TECHNOLOGIES CO., LTD., Guangdong (CN)

(72) Inventors: Ting Wang, Shanghai (CN); Hao Tang, Ottawa (CA); Xinxian Li, Shanghai (CN); Zhenfei Tang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 529 days.

(21) Appl. No.: 17/401,585

(22) Filed: Aug. 13, 2021

(65) Prior Publication Data

US 2021/0377963 A1 Dec. 2, 2021

Related U.S. Application Data

(63) Continuation of application No. PCT/CN2020/074555, filed on Feb. 7, 2020.

(30) Foreign Application Priority Data

Feb. 15, 2019 (CN) .......................... 201910116736.8

(51) Int. Cl.
*H04W 72/10* (2009.01)
*H04L 1/18* (2023.01)
(Continued)

(52) U.S. Cl.
CPC ........... *H04W 72/56* (2023.01); *H04L 1/1896* (2013.01); *H04W 72/02* (2013.01);
(Continued)

(58) Field of Classification Search
CPC . H04W 72/56; H04W 72/02; H04W 72/0453; H04W 72/0473; H04W 92/18; H04L 1/1896
(Continued)

(56) References Cited

U.S. PATENT DOCUMENTS

2017/0099683 A1 4/2017 Niddam et al.
2019/0387377 A1* 12/2019 Zhang ................. H04W 52/383

FOREIGN PATENT DOCUMENTS

CN 104885534 A 9/2015
CN 108174438 A 6/2018
(Continued)

OTHER PUBLICATIONS

Huawei et al, "Sidelink PHY structure and procedure for NR V2X", 3GPP TSG RAN WG1 Meeting #94bis R1-1810138, Oct. 8-12, total 15 pages.
(Continued)

*Primary Examiner* — Gbemileke J Onamuti
(74) *Attorney, Agent, or Firm* — WOMBLE BOND DICKINSON (US) LLP

(57) ABSTRACT

Disclosed are a communication method and an apparatus. The method includes: when a first terminal device supports sending of an uplink signal and a sidelink signal in a first time unit on a first carrier, determining, by the first terminal device based on priorities of the uplink signal and the sidelink signal, a first transmit power of the uplink signal and a second transmit power of the sidelink signal; and sending, by the first terminal device, the uplink signal based on the first transmit power, and/or sending the sidelink signal based on the second transmit power.

20 Claims, 8 Drawing Sheets

(51) Int. Cl.
| | |
|---|---|
| *H04L 1/1867* | (2023.01) |
| *H04W 72/02* | (2009.01) |
| *H04W 72/04* | (2023.01) |
| *H04W 72/044* | (2023.01) |
| *H04W 72/0453* | (2023.01) |
| *H04W 72/56* | (2023.01) |
| *H04W 92/18* | (2009.01) |

(52) U.S. Cl.
CPC ... *H04W 72/0453* (2013.01); *H04W 72/0473* (2013.01); *H04W 92/18* (2013.01)

(58) Field of Classification Search
USPC .......................................................... 370/329

See application file for complete search history.

(56) References Cited

FOREIGN PATENT DOCUMENTS

| | | |
|---|---|---|
| CN | 108419295 A | 8/2018 |
| CN | 108886445 A | 11/2018 |
| WO | 2016072382 A1 | 5/2016 |

OTHER PUBLICATIONS

Huawei et al, "Correction on sidelink power control for simultaneous UL and SL transmissions", 3GPP TSG-RAN1 Meeting #90 R1-1713822, Aug. 21-25, 2017, total 3 pages.

Ericsson, Coexistence Between Sidelink and Uplink Transmission. 3GPP TSG-RAN WG2#97, Athens, Greece, Feb. 13-17, 2017, R2-1700948, 4 pages.

Huawei, HiSilicon, Bandwidth Parts and Resource Pools for V2X sidelink. 3GPP TSG RAN WGI Meeting #95, Spokane, USA, Nov. 12-16, 2018, R1-1813555, 12 pages.

* cited by examiner

COMMUNICATION METHOD AND APPARATUS

CROSS-REFERENCE TO RELATED APPLICATIONS

This application is a continuation of International Application No. PCT/CN2020/074555, filed on Feb. 7, 2020, which claims priority to Chinese Patent Application No. 201910116736.8, filed on Feb. 15, 2019, The disclosures of the aforementioned applications are hereby incorporated by reference in their entireties.

TECHNICAL FIELD

This application relates to the field of communications technologies, and in particular, to a communication method and an apparatus.

BACKGROUND

In a new radio (NR) system, communication of a terminal device may include Uu air interface communication and sidelink (SL) communication. The Uu air interface communication refers to communication between a terminal device and a base station, and the SL communication refers to communication between terminal devices.

For the foregoing case, both uplink Uu air interface communication and SL communication may be supported on one carrier, and the carrier may be referred to as a shared carrier. How to send an uplink signal and an SL signal on the shared carrier is a current research focus.

SUMMARY

This application provides a communication method and an apparatus, to simultaneously send an uplink signal and a sidelink signal on a shared carrier.

According to a first aspect, a communication method is provided. The communication method includes: when a first terminal device supports sending of an uplink signal and a sidelink signal in a first time unit on a first carrier, determining, by the first terminal device based on priorities of the uplink signal and the sidelink signal, a first transmit power of the uplink signal and a second transmit power of the sidelink signal, where that the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, the first BWP is a BWP used to transmit the uplink signal, and the second BWP is a BWP used to transmit the sidelink signal; and sending, by the first terminal device, the uplink signal based on the first transmit power, and/or sending the sidelink signal based on the second transmit power.

It can be learned from the foregoing that, in an embodiment of the application, whether the first terminal device supports simultaneous transmission of the uplink signal and the sidelink signal may be determined based on one or more parameters in the foregoing set, so that current transmission of the first terminal device matches an actual transmission capability of the first terminal device. This avoids a case in which the terminal device has a relatively high transmission capability but transmits only one of the uplink signal or the sidelink signal, thereby improving utilization of the terminal device.

In an embodiment, the transmit link includes a first transmit link and a second transmit link; and that the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first bandwidth part BWP, and a bandwidth of a second BWP includes: if the first terminal device supports sending of the uplink signal on the first transmit link and sending of the sidelink signal on the second transmit link, the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, the first terminal device supports sending of the uplink signal and the sidelink signal in the first time unit on the first carrier; or if the first terminal device supports sending of the uplink signal on the first transmit link and sending of the sidelink signal on the second transmit link, a first waveform of the uplink signal is the same as a second waveform of the sidelink signal, and a first system parameter of the uplink signal is the same as a second system parameter of the sidelink signal, the first terminal device supports sending of the uplink signal and the sidelink signal in the first time unit on the first carrier.

It can be learned from the foregoing that, in an embodiment of the application, various factors are considered, and a signal transmission capability of the terminal device is considered, thereby improving utilization of the terminal device.

In an embodiment, the transmit link includes a third transmit link; and that the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first bandwidth part BWP, and a bandwidth of a second BWP includes: if the first terminal device supports sending of the uplink signal and the sidelink signal on the third transmit link, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier.

It can be learned from the foregoing that, in an embodiment of the application, when the terminal device supports only the third transmit link, other factors are comprehensively considered to determine whether the terminal device supports simultaneous transmission of the uplink signal and the sidelink signal. Compared with a manner in which it is determined that the terminal device does not support the uplink signal and the sidelink signal when the terminal device supports only the third transmit link, utilization of the terminal device can be improved.

In an embodiment, the inclusion relationship among the bandwidth of the transmit link, the bandwidth of the first BWP, and the bandwidth of the second BWP is a first inclusion relationship or a second inclusion relationship; and the first inclusion relationship is that the bandwidth of the transmit link includes the bandwidth of the first BWP and the bandwidth of the second BWP; and the second inclusion relationship is that the bandwidth of the transmit link includes the bandwidth of the first BWP and a part of the bandwidth of the second BWP, and the part of the bandwidth of the second BWP includes a sending resource pool for a sidelink.

In an embodiment, the transmit link includes a third transmit link; and that the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first BWP, and a bandwidth of a second BWP includes: if the first terminal device supports sending of the uplink signal and the sidelink signal on the third transmit link, and a bandwidth of the third transmit link includes the bandwidth of the first BWP and the bandwidth of the second BWP, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier.

It can be learned from the foregoing that, in an embodiment of the application, when the terminal device supports only the third transmit link, other factors are comprehensively considered to determine whether the terminal device supports simultaneous transmission of the uplink signal and the sidelink signal. Compared with a manner in which it is determined that the terminal device does not support the uplink signal and the sidelink signal when the terminal device supports only the third transmit link, utilization of the terminal device can be improved.

In an embodiment, the sidelink signal includes feedback information, the uplink signal includes data information, and the priority of the sidelink signal is higher than the priority of the uplink signal; or the uplink signal includes feedback information, the sidelink signal includes data information, and the priority of the uplink signal is higher than the priority of the sidelink signal; or the sidelink signal includes feedback information, the uplink signal includes feedback information, a priority of the feedback information in the sidelink signal is less than a first threshold, and the priority of the sidelink signal is higher than the priority of the uplink signal; or the sidelink signal includes feedback information, the uplink signal includes feedback information, a priority of the feedback information in the sidelink signal is greater than or equal to the first threshold, and the priority of the uplink signal is higher than the priority of the sidelink signal; or the sidelink signal includes data information, the uplink signal includes data information, a priority of the data information in the sidelink signal is less than a second threshold, and the priority of the sidelink signal is higher than the priority of the uplink signal; or the sidelink signal includes data information, the uplink signal includes data information, a priority of the data information in the sidelink signal is greater than or equal to the second threshold, and the priority of the uplink signal is higher than the priority of the sidelink signal.

In an embodiment, the uplink signal includes first-type feedback information, the sidelink signal includes second-type feedback information, a priority of the first-type feedback information is higher than a priority of the second-type feedback information, and the priority of the uplink signal is higher than the priority of the sidelink signal; or the uplink signal includes first-type feedback information, the sidelink signal includes second-type feedback information, a priority of the second-type feedback information is higher than priority of the first-type feedback information, and the priority of the sidelink signal is higher than the priority of the uplink signal; or the uplink signal includes first-type data information, the sidelink signal includes second-type data information, a priority of the first-type data information is higher than a priority of the second-type data information, and the priority of the uplink signal is higher than the priority of the sidelink signal; or the uplink signal includes first-type data information, the sidelink signal includes second-type data information, a priority of the second-type data information is higher than a priority of the first-type data information, and the priority of the sidelink signal is higher than the priority of the uplink signal; or the uplink signal and the sidelink signal both include third-type feedback information, a priority of the third-type feedback information is less than a third threshold, and the priority of the sidelink signal is higher than the priority of the uplink signal; or the uplink signal and the sidelink signal both include third-type feedback information, a priority of the third-type feedback information is greater than or equal to the third threshold, and the priority of the uplink signal is higher than the priority of the sidelink signal; or the uplink signal and the sidelink signal both include third-type data information, a priority of the third-type data information is less than a fourth threshold, and the priority of the sidelink signal is higher than the priority of the uplink signal; or the uplink signal and the sidelink signal both include third-type data information, a priority of the third-type data information is greater than or equal to the fourth threshold, and the priority of the uplink signal is higher than the priority of the sidelink signal.

It can be learned from the foregoing that, in an embodiment of the application, the priorities of the uplink signal and the sidelink signal are determined by considering different factors, to ensure correct transmission of a signal with a higher priority. Compared with a manner in which the transmit power of the uplink signal and the transmit power of the sidelink signal are equally divided, transmission of a signal with a higher priority can be ensured.

According to a second aspect, a communication method is provided. The communication method includes: receiving, by a second terminal device, a sidelink signal, where a transmit power of the sidelink signal is a second transmit power, the second transmit power is determined based on priorities of an uplink signal and the sidelink signal when a first terminal device supports sending of the uplink signal and the sidelink signal in a first time unit on a first carrier, that the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, the first BWP is a BWP used to transmit the uplink signal, and the second BWP is a BWP used to transmit the sidelink signal; and processing, by the second terminal device, the sidelink signal.

In an embodiment, the transmit link includes a first transmit link and a second transmit link; and that the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first bandwidth part BWP, and a bandwidth of a second BWP includes: if the first terminal device supports sending of the uplink signal on the first transmit link and sending of the sidelink signal on the second transmit link, the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, the first terminal device supports sending of the uplink signal and the sidelink signal in the first time unit on the first carrier; or if the first terminal device supports sending of the uplink signal on the first transmit link and sending of the sidelink signal on the second transmit link, a first waveform of the uplink signal is the same as a second waveform of the sidelink signal, and a first system parameter of the uplink signal is the same as a second system parameter of the sidelink signal, the first terminal device supports sending of the uplink signal and the sidelink signal in the first time unit on the first carrier.

In an embodiment, the transmit link includes a third transmit link; and that the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first bandwidth part BWP, and a bandwidth of a second BWP includes: if the first terminal device supports sending of the uplink signal and the sidelink signal on the third transmit link, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier.

In an embodiment, the inclusion relationship among the bandwidth of the transmit link, the bandwidth of the first BWP, and the bandwidth of the second BWP is a first inclusion relationship or a second inclusion relationship; and the first inclusion relationship is that the bandwidth of the transmit link includes the bandwidth of the first BWP and the bandwidth of the second BWP; and the second inclusion relationship is that the bandwidth of the transmit link includes the bandwidth of the first BWP and a part of the bandwidth of the second BWP, and the part of the bandwidth of the second BWP includes a sending resource pool for a sidelink.

In an embodiment, the transmit link includes a third transmit link; and that the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first BWP, and a bandwidth of a second BWP includes: if the first terminal device supports sending of the uplink signal and the sidelink signal on the third transmit link, and a bandwidth of the third transmit link includes the bandwidth of the first BWP and the bandwidth of the second BWP, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier.

In an embodiment, the sidelink signal includes feedback information, the uplink signal includes data information, and the priority of the sidelink signal is higher than the priority of the uplink signal; or the uplink signal includes feedback information, the sidelink signal includes data information, and the priority of the uplink signal is higher than the priority of the sidelink signal; or the sidelink signal includes feedback information, the uplink signal includes feedback information, a priority of the feedback information in the sidelink signal is less than a first threshold, and the priority of the sidelink signal is higher than the priority of the uplink signal; or the sidelink signal includes feedback information, the uplink signal includes feedback information, a priority of the feedback information in the sidelink signal is greater than or equal to the first threshold, and the priority of the uplink signal is higher than the priority of the sidelink signal; or the sidelink signal includes data information, the uplink signal includes data information, a priority of the data information in the sidelink signal is less than a second threshold, and the priority of the sidelink signal is higher than the priority of the uplink signal; or the sidelink signal includes data information, the uplink signal includes data information, a priority of the data information in the sidelink signal is greater than or equal to the second threshold, and the priority of the uplink signal is higher than the priority of the sidelink signal.

In an embodiment, the uplink signal includes first-type feedback information, the sidelink signal includes second-type feedback information, a priority of the first-type feedback information is higher than a priority of the second-type feedback information, and the priority of the uplink signal is higher than the priority of the sidelink signal; or the uplink signal includes first-type feedback information, the sidelink signal includes second-type feedback information, a priority of the second-type feedback information is higher than priority of the first-type feedback information, and the priority of the sidelink signal is higher than the priority of the uplink signal; or the uplink signal includes first-type data information, the sidelink signal includes second-type data information, a priority of the first-type data information is higher than a priority of the second-type data information, and the priority of the uplink signal is higher than the priority of the sidelink signal; or the uplink signal includes first-type data information, the sidelink signal includes second-type data information, a priority of the second-type data information is higher than a priority of the first-type data information, and the priority of the sidelink signal is higher than the priority of the uplink signal; or the uplink signal and the sidelink signal both include third-type feedback information, a priority of the third-type feedback information is less than a third threshold, and the priority of the sidelink signal is higher than the priority of the uplink signal; or the uplink signal and the sidelink signal both include third-type feedback information, a priority of the third-type feedback information is greater than or equal to the third threshold, and the priority of the uplink signal is higher than the priority of the sidelink signal; or the uplink signal and the sidelink signal both include third-type data information, a priority of the third-type data information is less than a fourth threshold, and the priority of the sidelink signal is higher than the priority of the uplink signal; or the uplink signal and the sidelink signal both include third-type data information, a priority of the third-type data information is greater than or equal to the fourth threshold, and the priority of the uplink signal is higher than the priority of the sidelink signal.

According to a third aspect, a communication method is provided. The communication method includes: receiving, by a network device, an uplink signal, where a transmit power of the uplink signal is a first transmit power, the first transmit power is determined based on priorities of the uplink signal and a sidelink signal when a first terminal device supports sending of the uplink signal and the sidelink signal in a first time unit on a first carrier, that the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, the first BWP is a BWP used to transmit the uplink signal, and the second BWP is a BWP used to transmit the sidelink signal; and processing, by the network device, the uplink signal.

In an embodiment, the transmit link includes a first transmit link and a second transmit link; and that the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first bandwidth part BWP, and a bandwidth of a second BWP includes: if the first terminal device supports sending of the uplink signal on the first transmit link and sending of the sidelink signal on the second transmit link, the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, the first terminal device supports sending of the uplink signal and the sidelink signal in the first time unit on the first carrier; or if the first terminal device supports sending of the uplink signal on the first transmit link and sending of the sidelink signal on the second transmit link, a first waveform of the uplink signal is the same as a second waveform of the sidelink signal, and a first system parameter of the uplink signal is the same as a second system parameter of the sidelink signal, the first terminal device supports sending of the uplink signal and the sidelink signal in the first time unit on the first carrier.

In an embodiment, the transmit link includes a third transmit link; and that the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first bandwidth part BWP, and a bandwidth of a second BWP includes: if the first terminal device supports sending of the uplink signal and the sidelink signal on the third transmit link, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier.

In an embodiment, the inclusion relationship among the bandwidth of the transmit link, the bandwidth of the first BWP, and the bandwidth of the second BWP is a first inclusion relationship or a second inclusion relationship; and the first inclusion relationship is that the bandwidth of the transmit link includes the bandwidth of the first BWP and the bandwidth of the second BWP; and the second inclusion relationship is that the bandwidth of the transmit link includes the bandwidth of the first BWP and a part of the bandwidth of the second BWP, and the part of the bandwidth of the second BWP includes a sending resource pool for a sidelink.

In an embodiment, the transmit link includes a third transmit link; and that the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first BWP, and a bandwidth of a second BWP includes: if the first terminal device supports sending of the uplink signal and the sidelink signal on the third transmit link, and a bandwidth of the third transmit link includes the bandwidth of the first BWP and the bandwidth of the second BWP, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier.

In an embodiment, the sidelink signal includes feedback information, the uplink signal includes data information, and the priority of the sidelink signal is higher than the priority of the uplink signal; or the uplink signal includes feedback information, the sidelink signal includes data information, and the priority of the uplink signal is higher than the priority of the sidelink signal; or the sidelink signal includes feedback information, the uplink signal includes feedback information, a priority of the feedback information in the sidelink signal is less than a first threshold, and the priority of the sidelink signal is higher than the priority of the uplink signal; or the sidelink signal includes feedback information, the uplink signal includes feedback information, a priority of the feedback information in the sidelink signal is greater than or equal to the first threshold, and the priority of the uplink signal is higher than the priority of the sidelink signal; or the sidelink signal includes data information, the uplink signal includes data information, a priority of the data information in the sidelink signal is less than a second threshold, and the priority of the sidelink signal is higher than the priority of the uplink signal; or the sidelink signal includes data information, the uplink signal includes data information, a priority of the data information in the sidelink signal is greater than or equal to the second threshold, and the priority of the uplink signal is higher than the priority of the sidelink signal.

In an embodiment, the uplink signal includes first-type feedback information, the sidelink signal includes second-type feedback information, a priority of the first-type feedback information is higher than a priority of the second-type feedback information, and the priority of the uplink signal is higher than the priority of the sidelink signal; or the uplink signal includes first-type feedback information, the sidelink signal includes second-type feedback information, a priority of the second-type feedback information is higher than priority of the first-type feedback information, and the priority of the sidelink signal is higher than the priority of the uplink signal; or the uplink signal includes first-type data information, the sidelink signal includes second-type data information, a priority of the first-type data information is higher than a priority of the second-type data information, and the priority of the uplink signal is higher than the priority of the sidelink signal; or the uplink signal includes first-type data information, the sidelink signal includes second-type data information, a priority of the second-type data information is higher than a priority of the first-type data information, and the priority of the sidelink signal is higher than the priority of the uplink signal; or the uplink signal and the sidelink signal both include third-type feedback information, a priority of the third-type feedback information is less than a third threshold, and the priority of the sidelink signal is higher than the priority of the uplink signal; or the uplink signal and the sidelink signal both include third-type feedback information, a priority of the third-type feedback information is greater than or equal to the third threshold, and the priority of the uplink signal is higher than the priority of the sidelink signal; or the uplink signal and the sidelink signal both include third-type data information, a priority of the third-type data information is less than a fourth threshold, and the priority of the sidelink signal is higher than the priority of the uplink signal; or the uplink signal and the sidelink signal both include third-type data information, a priority of the third-type data information is greater than or equal to the fourth threshold, and the priority of the uplink signal is higher than the priority of the sidelink signal.

According to a fourth aspect, this application provides an apparatus. The apparatus may be a terminal device, or may be an apparatus in the terminal device, or an apparatus that can be used in coordination with the terminal device. The apparatus may include a processing module and a transceiver module, and the processing module and the transceiver module may perform a corresponding function in any one of the foregoing design examples of the first aspect. Details are as follows:

The processing module is configured to: when a first terminal device supports sending of an uplink signal and a sidelink signal in a first time unit on a first carrier, determine, based on priorities of the uplink signal and the sidelink signal, a first transmit power of the uplink signal and a second transmit power of the sidelink signal, where that the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, the first BWP is a BWP used to transmit the uplink signal, and the second BWP is a BWP used to transmit the sidelink signal.

The transceiver module is configured to send the uplink signal based on the first transmit power, and/or send the sidelink signal based on the second transmit power.

In an embodiment, the transmit link includes a first transmit link and the second transmit link; and the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first bandwidth part BWP, and a bandwidth of a second BWP, comprises:

if the first terminal device supports sending of the uplink signal on the first transmit link and sending of the sidelink signal on the second transmit link, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, a first waveform of the uplink signal is the same as a second waveform of the sidelink signal, and a first system parameter of the uplink signal is the same as a second system parameter of the sidelink signal, determine that the first terminal device supports sending of the uplink signal and the sidelink signal in the first time unit on the first carrier.

In an embodiment, the transmit link includes a third transmit link; and the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal and the sidelink signal on the third transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the inclusion relationship among the bandwidth of the transmit link, the bandwidth of the first BWP, and the bandwidth of the second BWP is a first inclusion relationship or a second inclusion relationship; and the first inclusion relationship is that the bandwidth of the transmit link includes the bandwidth of the first BWP and the bandwidth of the second BWP; and the second inclusion relationship is that the bandwidth of the transmit link includes the bandwidth of the first BWP and a part of the bandwidth of the second BWP, and the part of the bandwidth of the second BWP includes a sending resource pool for a sidelink.

In an embodiment, the transmit link includes a third transmit link; and the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first BWP, and a bandwidth of a second BWP, comprises: if the first terminal device supports sending of the uplink signal and the sidelink signal on the third transmit link, and a bandwidth of the third transmit link includes the bandwidth of the first BWP and the bandwidth of the second BWP, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the sidelink signal includes feedback information, the uplink signal includes data information, and the priority of the sidelink signal is higher than the priority of the uplink signal; or the uplink signal includes feedback information, the sidelink signal includes data information, and the priority of the uplink signal is higher than the priority of the sidelink signal; or the sidelink signal includes feedback information, the uplink signal includes feedback information, a priority of the feedback information in the sidelink signal is less than a first threshold, and the priority of the sidelink signal is higher than the priority of the uplink signal; or the sidelink signal includes feedback information, the uplink signal includes feedback information, a priority of the feedback information in the sidelink signal is greater than or equal to the first threshold, and the priority of the uplink signal is higher than the priority of the sidelink signal; or the sidelink signal includes data information, the uplink signal includes data information, a priority of the data information in the sidelink signal is less than a second threshold, and the priority of the sidelink signal is higher than the priority of the uplink signal; or the sidelink signal includes data information, the uplink signal includes data information, a priority of the data information in the sidelink signal is greater than or equal to the second threshold, and the priority of the uplink signal is higher than the priority of the sidelink signal.

In an embodiment, the uplink signal includes first-type feedback information, the sidelink signal includes second-type feedback information, a priority of the first-type feedback information is higher than a priority of the second-type feedback information, and the priority of the uplink signal is higher than the priority of the sidelink signal; or the uplink signal includes first-type feedback information, the sidelink signal includes second-type feedback information, a priority of the second-type feedback information is higher than priority of the first-type feedback information, and the priority of the sidelink signal is higher than the priority of the uplink signal; or the uplink signal includes first-type data information, the sidelink signal includes second-type data information, a priority of the first-type data information is higher than a priority of the second-type data information, and the priority of the uplink signal is higher than the priority of the sidelink signal; or the uplink signal includes first-type data information, the sidelink signal includes second-type data information, a priority of the second-type data information is higher than a priority of the first-type data information, and the priority of the sidelink signal is higher than the priority of the uplink signal; or the uplink signal and the sidelink signal both include third-type feedback information, a priority of the third-type feedback information is less than a third threshold, and the priority of the sidelink signal is higher than the priority of the uplink signal; or the uplink signal and the sidelink signal both include third-type feedback information, a priority of the third-type feedback information is greater than or equal to the third threshold, and the priority of the uplink signal is higher than the priority of the sidelink signal; or the uplink signal and the sidelink signal both include third-type data information, a priority of the third-type data information is less than a fourth threshold, and the priority of the sidelink signal is higher than the priority of the uplink signal; or the uplink signal and the sidelink signal both include third-type data information, a priority of the third-type data information is greater than or equal to the fourth threshold, and the priority of the uplink signal is higher than the priority of the sidelink signal.

According to a fifth aspect, an embodiment of this application provides an apparatus. The apparatus includes a processor, configured to implement the method described in the first aspect. The apparatus may further include a memory, configured to store instructions and data. The memory is coupled to the processor. When executing program instructions stored in the memory, the processor can implement the method described in the first aspect. The apparatus may further include a communications interface. The communications interface is used by the apparatus to communicate with another device. For example, the communications interface may be a transceiver, a circuit, a bus, a module, or a communications interface of another type. The another device may be a network device, a second terminal device, or the like. In an embodiment, the apparatus includes:

a memory, configured to store program instructions;

a processor, configured to: when a first terminal device supports sending of an uplink signal and a sidelink signal in a first time unit on a first carrier, determine, based on priorities of the uplink signal and the sidelink signal, a first transmit power of the uplink signal and a second transmit power of the sidelink signal, where that the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, the first BWP is a BWP used to transmit the uplink signal, and the second BWP is a BWP used to transmit the sidelink signal; and a communications interface, configured to send the uplink signal based on the first transmit power, and/or send the sidelink signal based on the second transmit power.

In an embodiment, the transmit link includes a first transmit link and a second transmit link; and the first terminal device supports sending of the uplink signal and the sidelink signal in the first time unit on the first carrier being determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal on the first transmit link and sending of the sidelink signal on the second transmit link, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, a first waveform of the uplink signal is the same as a second waveform of the sidelink signal, and a first system parameter of the uplink signal is the same as a second system parameter of the sidelink signal, determine that the first terminal device supports sending of the uplink signal and the sidelink signal in the first time unit on the first carrier.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal and the sidelink signal on the third transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the inclusion relationship among the bandwidth of the transmit link, the bandwidth of the first BWP, and the bandwidth of the second BWP is a first inclusion relationship or a second inclusion relationship; and the first inclusion relationship is that the bandwidth of the transmit link includes the bandwidth of the first BWP and the bandwidth of the second BWP; and the second inclusion relationship is that the bandwidth of the transmit link includes the bandwidth of the first BWP and a part of the bandwidth of the second BWP, and the part of the bandwidth of the second BWP includes a sending resource pool for a sidelink.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first BWP, and a bandwidth of a second BWP, comprises: if the first terminal device supports sending of the uplink signal and the sidelink signal on the third transmit link, and a bandwidth of the third transmit link includes the bandwidth of the first BWP and the bandwidth of the second BWP, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the sidelink signal includes feedback information, the uplink signal includes data information, and the priority of the sidelink signal is higher than the priority of the uplink signal; or the uplink signal includes feedback information, the sidelink signal includes data information, and the priority of the uplink signal is higher than the priority of the sidelink signal; or the sidelink signal includes feedback information, the uplink signal includes feedback information, a priority of the feedback information in the sidelink signal is less than a first threshold, and the priority of the sidelink signal is higher than the priority of the uplink signal; or the sidelink signal includes feedback information, the uplink signal includes feedback information, a priority of the feedback information in the sidelink signal is greater than or equal to the first threshold, and the priority of the uplink signal is higher than the priority of the sidelink signal; or the sidelink signal includes data information, the uplink signal includes data information, a priority of the data information in the sidelink signal is less than a second threshold, and the priority of the sidelink signal is higher than the priority of the uplink signal; or the sidelink signal includes data information, the uplink signal includes data information, a priority of the data information in the sidelink signal is greater than or equal to the second threshold, and the priority of the uplink signal is higher than the priority of the sidelink signal.

In an embodiment, the uplink signal includes first-type feedback information, the sidelink signal includes second-type feedback information, a priority of the first-type feedback information is higher than a priority of the second-type feedback information, and the priority of the uplink signal is higher than the priority of the sidelink signal; or the uplink signal includes first-type feedback information, the sidelink signal includes second-type feedback information, a priority of the second-type feedback information is higher than priority of the first-type feedback information, and the priority of the sidelink signal is higher than the priority of the uplink signal; or the uplink signal includes first-type data information, the sidelink signal includes second-type data information, a priority of the first-type data information is higher than a priority of the second-type data information, and the priority of the uplink signal is higher than the priority of the sidelink signal; or the uplink signal includes first-type data information, the sidelink signal includes second-type data information, a priority of the second-type data information is higher than a priority of the first-type data information, and the priority of the sidelink signal is higher than the priority of the uplink signal; or the uplink signal and the sidelink signal both include third-type feedback information, a priority of the third-type feedback information is less than a third threshold, and the priority of the sidelink signal is higher than the priority of the uplink signal; or the uplink signal and the sidelink signal both include third-type feedback information, a priority of the third-type feedback information is greater than or equal to the third threshold, and the priority of the uplink signal is higher than the priority of the sidelink signal; or the uplink signal and the sidelink signal both include third-type data information, a priority of the third-type data information is less than a fourth threshold, and the priority of the sidelink signal is higher than the priority of the uplink signal; or the uplink signal and the sidelink signal both include third-type data information, a priority of the third-type data information is greater than or equal to the fourth threshold, and the priority of the uplink signal is higher than the priority of the sidelink signal.

According to a sixth aspect, this application provides an apparatus. The apparatus may be a terminal device, or may be an apparatus in the terminal device, or an apparatus that can be used in coordination with the terminal device. The apparatus may include a processing module and a transceiver module, and the processing module and the transceiver module may perform a corresponding function in any one of the foregoing design examples of the second aspect. Details are as follows:

The transceiver module is configured to receive a sidelink signal.

A transmit power of the sidelink signal is a second transmit power, the second transmit power is determined based on priorities of an uplink signal and the sidelink signal when a first terminal device supports sending of the uplink signal and the sidelink signal in a first time unit on a first carrier, that the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, the first BWP is a BWP used to transmit the uplink signal, and the second BWP is a BWP used to transmit the sidelink signal.

The processing module is configured to process the sidelink signal.

In an embodiment, the transmit link includes a first transmit link and a second transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal on the first transmit link and sending of the sidelink signal on the second transmit link, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, a first waveform of the uplink signal is the same as a second waveform of the sidelink signal, and a first system parameter of the uplink signal is the same as a second system parameter of the sidelink signal, determine that the first terminal device supports sending of the uplink signal and the sidelink signal in the first time unit on the first carrier.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, comprises:

if the first terminal device supports sending of the uplink signal and the sidelink signal on the third transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the inclusion relationship among the bandwidth of the transmit link, the bandwidth of the first BWP, and the bandwidth of the second BWP is a first inclusion relationship or a second inclusion relationship; and the first inclusion relationship is that the bandwidth of the transmit link includes the bandwidth of the first BWP and the bandwidth of the second BWP; and the second inclusion relationship is that the bandwidth of the transmit link includes the bandwidth of the first BWP and a part of the bandwidth of the second BWP, and the part of the bandwidth of the second BWP includes a sending resource pool for a sidelink.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first BWP, and a bandwidth of a second BWP, comprises: if the first terminal device supports sending of the uplink signal and the sidelink signal on the third transmit link, and a bandwidth of the third transmit link includes the bandwidth of the first BWP and the bandwidth of the second BWP, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the sidelink signal includes feedback information, the uplink signal includes data information, and the priority of the sidelink signal is higher than the priority of the uplink signal; or the uplink signal includes feedback information, the sidelink signal includes data information, and the priority of the uplink signal is higher than the priority of the sidelink signal; or the sidelink signal includes feedback information, the uplink signal includes feedback information, a priority of the feedback information in the sidelink signal is less than a first threshold, and the priority of the sidelink signal is higher than the priority of the uplink signal; or the sidelink signal includes feedback information, the uplink signal includes feedback information, a priority of the feedback information in the sidelink signal is greater than or equal to the first threshold, and the priority of the uplink signal is higher than the priority of the sidelink signal; or the sidelink signal includes data information, the uplink signal includes data information, a priority of the data information in the sidelink signal is less than a second threshold, and the priority of the sidelink signal is higher than the priority of the uplink signal; or the sidelink signal includes data information, the uplink signal includes data information, a priority of the data information in the sidelink signal is greater than or equal to the second threshold, and the priority of the uplink signal is higher than the priority of the sidelink signal.

In an embodiment, the uplink signal includes first-type feedback information, the sidelink signal includes second-type feedback information, a priority of the first-type feedback information is higher than a priority of the second-type feedback information, and the priority of the uplink signal is higher than the priority of the sidelink signal; or the uplink signal includes first-type feedback information, the sidelink signal includes second-type feedback information, a priority of the second-type feedback information is higher than priority of the first-type feedback information, and the priority of the sidelink signal is higher than the priority of the uplink signal; or the uplink signal includes first-type data information, the sidelink signal includes second-type data information, a priority of the first-type data information is higher than a priority of the second-type data information, and the priority of the uplink signal is higher than the priority of the sidelink signal; or the uplink signal includes first-type data information, the sidelink signal includes second-type data information, a priority of the second-type data information is higher than a priority of the first-type data information, and the priority of the sidelink signal is higher than the priority of the uplink signal; or the uplink signal and the sidelink signal both include third-type feedback information, a priority of the third-type feedback information is less than a third threshold, and the priority of the sidelink signal is higher than the priority of the uplink signal; or the uplink signal and the sidelink signal both include third-type feedback information, a priority of the third-type feedback information is greater than or equal to the third threshold, and the priority of the uplink signal is higher than the priority of the sidelink signal; or the uplink signal and the sidelink signal both include third-type data information, a priority of the third-type data information is less than a fourth threshold, and the priority of the sidelink signal is higher than the priority of the uplink signal; or the uplink signal and the sidelink signal both include third-type data information, a priority of the third-type data information is greater than or equal to the fourth threshold, and the priority of the uplink signal is higher than the priority of the sidelink signal.

According to a seventh aspect, an embodiment of this application provides an apparatus. The apparatus includes a processor, configured to implement the method described in the second aspect. The apparatus may further include a memory, configured to store instructions and data. The memory is coupled to the processor. When executing program instructions stored in the memory, the processor can implement the method described in the first aspect. The apparatus may further include a communications interface. The communications interface is used by the apparatus to communicate with another device. For example, the communications interface may be a transceiver, a circuit, a bus, a module, or a communications interface of another type. The another device may be a network device, a second terminal device, or the like. In an embodiment, the apparatus includes:

a memory, configured to store program instructions;

a communications interface, configured to receive a sidelink signal, where a transmit power of the sidelink signal is a second transmit power, the second transmit power is determined based on priorities of an uplink signal and the sidelink signal when a first terminal device supports sending of the uplink signal and the sidelink signal in a first time unit on a first carrier, that the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, the first BWP is a BWP used to transmit the uplink signal, and the second BWP is a BWP used to transmit the sidelink signal; and a processor, configured to process the sidelink signal.

In an embodiment, the transmit link includes a first transmit link and a second transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal on the first transmit link and sending of the sidelink signal on the second transmit link, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, a first waveform of the uplink signal is the same as a second waveform of the sidelink signal, and a first system parameter of the uplink signal is the same as a second system parameter of the sidelink signal, determine that the first terminal device supports sending of the uplink signal and the sidelink signal in the first time unit on the first carrier.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal and the sidelink signal on the third transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the inclusion relationship among the bandwidth of the transmit link, the bandwidth of the first BWP, and the bandwidth of the second BWP is a first inclusion relationship or a second inclusion relationship; and the first inclusion relationship is that the bandwidth of the transmit link includes the bandwidth of the first BWP and the bandwidth of the second BWP; and the second inclusion relationship is that the bandwidth of the transmit link includes the bandwidth of the first BWP and a part of the bandwidth of the second BWP, and the part of the bandwidth of the second BWP includes a sending resource pool for a sidelink.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first BWP, and a bandwidth of a second BWP, comprises: if the first terminal device supports sending of the uplink signal and the sidelink signal on the third transmit link, and a bandwidth of the third transmit link includes the bandwidth of the first BWP and the bandwidth of the second BWP, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the sidelink signal includes feedback information, the uplink signal includes data information, and the priority of the sidelink signal is higher than the priority of the uplink signal; or the uplink signal includes feedback information, the sidelink signal includes data information, and the priority of the uplink signal is higher than the priority of the sidelink signal; or the sidelink signal includes feedback information, the uplink signal includes feedback information, a priority of the feedback information in the sidelink signal is less than a first threshold, and the priority of the sidelink signal is higher than the priority of the uplink signal; or the sidelink signal includes feedback information, the uplink signal includes feedback information, a priority of the feedback information in the sidelink signal is greater than or equal to the first threshold, and the priority of the uplink signal is higher than the priority of the sidelink signal; or the sidelink signal includes data information, the uplink signal includes data information, a priority of the data information in the sidelink signal is less than a second threshold, and the priority of the sidelink signal is higher than the priority of the uplink signal; or the sidelink signal includes data information, the uplink signal includes data information, a priority of the data information in the sidelink signal is greater than or equal to the second threshold, and the priority of the uplink signal is higher than the priority of the sidelink signal.

In an embodiment, the uplink signal includes first-type feedback information, the sidelink signal includes second-type feedback information, a priority of the first-type feedback information is higher than a priority of the second-type feedback information, and the priority of the uplink signal is higher than the priority of the sidelink signal; or the uplink signal includes first-type feedback information, the sidelink signal includes second-type feedback information, a priority of the second-type feedback information is higher than priority of the first-type feedback information, and the priority of the sidelink signal is higher than the priority of the uplink signal; or the uplink signal includes first-type data information, the sidelink signal includes second-type data information, a priority of the first-type data information is higher than a priority of the second-type data information, and the priority of the uplink signal is higher than the priority of the sidelink signal; or the uplink signal includes first-type data information, the sidelink signal includes second-type data information, a priority of the second-type data information is higher than a priority of the first-type data information, and the priority of the sidelink signal is higher than the priority of the uplink signal; or the uplink signal and the sidelink signal both include third-type feedback information, a priority of the third-type feedback information is less than a third threshold, and the priority of the sidelink signal is higher than the priority of the uplink signal; or the uplink signal and the sidelink signal both include third-type feedback information, a priority of the third-type feedback information is greater than or equal to the third threshold, and the priority of the uplink signal is higher than the priority of the sidelink signal; or the uplink signal and the sidelink signal both include third-type data information, a priority of the third-type data information is less than a fourth threshold, and the priority of the sidelink signal is higher than the priority of the uplink signal; or the uplink signal and the sidelink signal both include third-type data information, a priority of the third-type data information is greater than or equal to the fourth threshold, and the priority of the uplink signal is higher than the priority of the sidelink signal.

According to an eighth aspect, this application provides an apparatus. The apparatus may be a network device, or may be an apparatus in the network device, or an apparatus that can be used in coordination with the network device. The apparatus may include a processing module and transceiver module, and the processing module and the transceiver module may perform a corresponding function in any one of the foregoing design examples of the third aspect. Details are as follows:

The transceiver module is configured to receive an uplink signal.

A transmit power of the uplink signal is a first transmit power, the first transmit power is determined based on priorities of the uplink signal and a sidelink signal when a first terminal device supports sending of the uplink signal and the sidelink signal in a first time unit on a first carrier, that the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, the first BWP is a BWP used to transmit the uplink signal, and the second BWP is a BWP used to transmit the sidelink signal.

The processing module is configured to process the uplink signal.

In an embodiment, the transmit link includes a first transmit link and a second transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal on the first transmit link and sending of the sidelink signal on the second transmit link, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, a first waveform of the uplink signal is the same as a second waveform of the sidelink signal, and a first system parameter of the uplink signal is the same as a second system parameter of the sidelink signal, determine that the first terminal device supports sending of the uplink signal and the sidelink signal in the first time unit on the first carrier.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal and the sidelink signal on the third transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the inclusion relationship among the bandwidth of the transmit link, the bandwidth of the first BWP, and the bandwidth of the second BWP is a first inclusion relationship or a second inclusion relationship; and the first inclusion relationship is that the bandwidth of the transmit link includes the bandwidth of the first BWP and the bandwidth of the second BWP; and the second inclusion relationship is that the bandwidth of the transmit link includes the bandwidth of the first BWP and a part of the bandwidth of the second BWP, and the part of the bandwidth of the second BWP includes a sending resource pool for a sidelink.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first BWP, and a bandwidth of a second BWP, comprises: if the first terminal device supports sending of the uplink signal and the sidelink signal on the third transmit link, and a bandwidth of the third transmit link includes the bandwidth of the first BWP and the bandwidth of the second BWP, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the sidelink signal includes feedback information, the uplink signal includes data information, and the priority of the sidelink signal is higher than the priority of the uplink signal; or the uplink signal includes feedback information, the sidelink signal includes data information, and the priority of the uplink signal is higher than the priority of the sidelink signal; or the sidelink signal includes feedback information, the uplink signal includes feedback information, a priority of the feedback information in the sidelink signal is less than a first threshold, and the priority of the sidelink signal is higher than the priority of the uplink signal; or the sidelink signal includes feedback information, the uplink signal includes feedback information, a priority of the feedback information in the sidelink signal is greater than or equal to the first threshold, and the priority of the uplink signal is higher than the priority of the sidelink signal; or the sidelink signal includes data information, the uplink signal includes data information, a priority of the data information in the sidelink signal is less than a second threshold, and the priority of the sidelink signal is higher than the priority of the uplink signal; or the sidelink signal includes data information, the uplink signal includes data information, a priority of the data information in the sidelink signal is greater than or equal to the second threshold, and the priority of the uplink signal is higher than the priority of the sidelink signal.

In an embodiment, the uplink signal includes first-type feedback information, the sidelink signal includes second-type feedback information, a priority of the first-type feedback information is higher than a priority of the second-type feedback information, and the priority of the uplink signal is higher than the priority of the sidelink signal; or the uplink signal includes first-type feedback information, the sidelink signal includes second-type feedback information, a priority of the second-type feedback information is higher than priority of the first-type feedback information, and the priority of the sidelink signal is higher than the priority of the uplink signal; or the uplink signal includes first-type data information, the sidelink signal includes second-type data information, a priority of the first-type data information is higher than a priority of the second-type data information, and the priority of the uplink signal is higher than the priority of the sidelink signal; or the uplink signal includes first-type data information, the sidelink signal includes second-type data information, a priority of the second-type data information is higher than a priority of the first-type data information, and the priority of the sidelink signal is higher than the priority of the uplink signal; or the uplink signal and the sidelink signal both include third-type feedback information, a priority of the third-type feedback information is less than a third threshold, and the priority of the sidelink signal is higher than the priority of the uplink signal; or the uplink signal and the sidelink signal both include third-type feedback information, a priority of the third-type feedback information is greater than or equal to the third threshold, and the priority of the uplink signal is higher than the priority of the sidelink signal; or the uplink signal and the sidelink signal both include third-type data information, a priority of the third-type data information is less than a fourth threshold, and the priority of the sidelink signal is higher than the priority of the uplink signal; or the uplink signal and the sidelink signal both include third-type data information, a priority of the third-type data information is greater than or equal to the fourth threshold, and the priority of the uplink signal is higher than the priority of the sidelink signal.

According to a ninth aspect, an embodiment of this application provides an apparatus. The apparatus includes a processor, configured to implement the method described in the third aspect. The apparatus may further include a memory, configured to store instructions and data. The memory is coupled to the processor. When executing program instructions stored in the memory, the processor can implement the method described in the third aspect. The apparatus may further include a communications interface. The communications interface is used by the apparatus to communicate with another device. For example, the communications interface may be a transceiver, a circuit, a bus, a module, or a communications interface of another type. The another device may be a first terminal device, a second terminal device, or the like. In an embodiment, the apparatus includes:

a memory, configured to store program instructions;

a communications interface, configured to receive an uplink signal, where a transmit power of the uplink signal is a first transmit power, the first transmit power is determined based on priorities of the uplink signal and a sidelink signal when a first terminal device supports sending of the uplink signal and the sidelink signal in a first time unit on a first carrier, that the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, the first BWP is a BWP used to transmit the uplink signal, and the second BWP is a BWP used to transmit the sidelink signal; and a processor, configured to process the uplink signal.

In an embodiment, the transmit link includes a first transmit link and a second transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal on the first transmit link and sending of the sidelink signal on the second transmit link, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal on the first transmit link and sending of the sidelink signal on the second transmit link, a first waveform of the uplink signal is the same as a second waveform of the sidelink signal, and a first system parameter of the uplink signal is the same as a second system parameter of the sidelink signal, determine that the first terminal device supports sending of the uplink signal and the sidelink signal in the first time unit on the first carrier.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first bandwidth part BWP, and a bandwidth of a second BWP, comprises: if the first terminal device supports sending of the uplink signal and the sidelink signal on the third transmit link, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the inclusion relationship among the bandwidth of the transmit link, the bandwidth of the first BWP, and the bandwidth of the second BWP is a first inclusion relationship or a second inclusion relationship; and the first inclusion relationship is that the bandwidth of the transmit link includes the bandwidth of the first BWP and the bandwidth of the second BWP; and the second inclusion relationship is that the bandwidth of the transmit link includes the bandwidth of the first BWP and a part of the bandwidth of the second BWP, and the part of the bandwidth of the second BWP includes a sending resource pool for a sidelink.

In an embodiment, the transmit link includes a third transmit link; and the first terminal device supports sending of the uplink signal and the sidelink signal in the first time unit on the first carrier is determined based on one or more in the following set: a transmit link, a system parameter, a waveform, and an inclusion relationship among a bandwidth of the transmit link, a bandwidth of a first BWP, and a bandwidth of a second BWP, comprises: if the first terminal device supports sending of the uplink signal and the sidelink signal on the third transmit link, and a bandwidth of the third transmit link includes the bandwidth of the first BWP and the bandwidth of the second BWP, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the bandwidth of the second BWP, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first system parameter of the uplink signal is the same as a second system parameter of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, and a first waveform of the uplink signal is the same as a second waveform of the sidelink signal, determine that the first terminal device supports sending of the uplink signal and the sidelink signal in the first time unit on the first carrier; or if the first terminal device supports sending of the uplink signal and the sidelink signal on the third transmit link, a bandwidth of the third transmit link includes the bandwidth of the first BWP and the part of the bandwidth of the second BWP, the part of the bandwidth of the second BWP includes the sending resource pool for the sidelink, a first system parameter of the uplink signal is the same as a second system parameter of the sidelink signal, and a first waveform of the uplink signal is the same as a second waveform of the sidelink signal, determine that the first terminal device supports sending of the uplink signal and the sidelink signal in the first time unit on the first carrier.

In an embodiment, the sidelink signal includes feedback information, the uplink signal includes data information, and the priority of the sidelink signal is higher than the priority of the uplink signal; or the uplink signal includes feedback information, the sidelink signal includes data information, and the priority of the uplink signal is higher than the priority of the sidelink signal; or the sidelink signal includes feedback information, the uplink signal includes feedback information, a priority of the feedback information in the sidelink signal is less than a first threshold, and the priority of the sidelink signal is higher than the priority of the uplink signal; or the sidelink signal includes feedback information, the uplink signal includes feedback information, a priority of the feedback information in the sidelink signal is greater than or equal to the first threshold, and the priority of the uplink signal is higher than the priority of the sidelink signal; or the sidelink signal includes data information, the uplink signal includes data information, a priority of the data information in the sidelink signal is less than a second threshold, and the priority of the sidelink signal is higher than the priority of the uplink signal; or the sidelink signal includes data information, the uplink signal includes data information, a priority of the data information in the sidelink signal is greater than or equal to the second threshold, and the priority of the uplink signal is higher than the priority of the sidelink signal.

In an embodiment, the uplink signal includes first-type feedback information, the sidelink signal includes second-type feedback information, a priority of the first-type feedback information is higher than a priority of the second-type feedback information, and the priority of the uplink signal is higher than the priority of the sidelink signal; or the uplink signal includes first-type feedback information, the sidelink signal includes second-type feedback information, a priority of the second-type feedback information is higher than priority of the first-type feedback information, and the priority of the sidelink signal is higher than the priority of the uplink signal; or the uplink signal includes first-type data information, the sidelink signal includes second-type data information, a priority of the first-type data information is higher than a priority of the second-type data information, and the priority of the uplink signal is higher than the priority of the sidelink signal; or the uplink signal includes first-type data information, the sidelink signal includes second-type data information, a priority of the second-type data information is higher than a priority of the first-type data information, and the priority of the sidelink signal is higher than the priority of the uplink signal; or the uplink signal and the sidelink signal both include third-type feedback information, a priority of the third-type feedback information is less than a third threshold, and the priority of the sidelink signal is higher than the priority of the uplink signal; or the uplink signal and the sidelink signal both include third-type feedback information, a priority of the third-type feedback information is greater than or equal to the third threshold, and the priority of the uplink signal is higher than the priority of the sidelink signal; or the uplink signal and the sidelink signal both include third-type data information, a priority of the third-type data information is less than a fourth threshold, and the priority of the sidelink signal is higher than the priority of the uplink signal; or the uplink signal and the sidelink signal both include third-type data information, a priority of the third-type data information is greater than or equal to the fourth threshold, and the priority of the uplink signal is higher than the priority of the sidelink signal.

According to a tenth aspect, an embodiment of this application further provides a computer-readable storage medium, including instructions. When the instructions are run on a computer, the computer is enabled to perform the method according to any one of the first aspect to the third aspect.

According to an eleventh aspect, an embodiment of this application further provides a chip system. The chip system includes a processor, and may further include a memory, and is configured to implement the method according to any one of the first aspect to the third aspect. The chip system may include a chip, or may include a chip and another discrete component.

According to a twelfth aspect, an embodiment of this application further provides a computer program product, including instructions. When the computer program product runs on a computer, the computer is enabled to perform the method according to any one of the first aspect to the third aspect.

DESCRIPTION OF EMBODIMENTS

The following describes the technical solutions in the embodiments of this application with reference to the accompanying drawings in the embodiments of this application.

Figure 1:
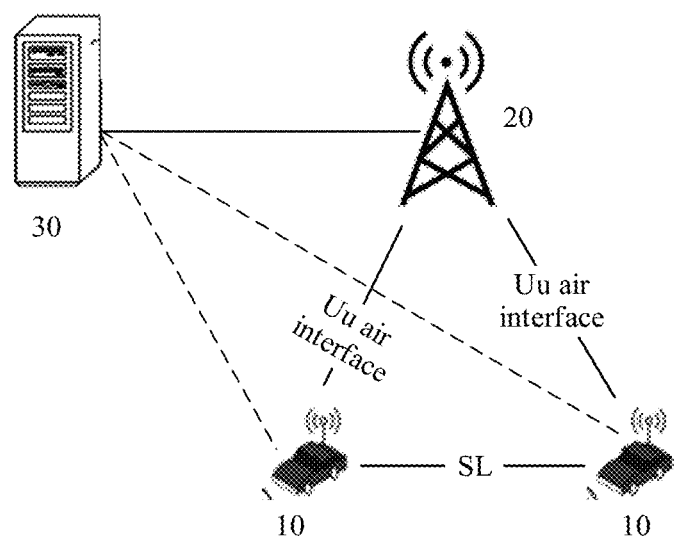
FIG. 1 is a schematic diagram of a system architecture according to an embodiment of this application.

FIG. 1 is a schematic diagram of a possible network architecture to which an embodiment of this application is applicable. The network architecture includes terminal devices 10.

There are two or more terminal devices 10, and different terminal devices may perform sidelink (SL) communication through a sidelink, to transmit sidelink information. For example, the sidelink information may include one or more of data and a scheduling assignment (SA). The data may also be referred to as data information, and the scheduling assignment may also be referred to as scheduling assignment information.

In an embodiment, the sidelink information may further include sidelink feedback information. For example, the sidelink feedback information may include one or more of channel state information (CSI) and hybrid automatic repeat request (HARQ) information. For example, the HARQ information may be acknowledgement (ACK) information or a negative acknowledgement (NACK).

In an embodiment, the network architecture shown in FIG. 1 may further include a network device 20. For example, the terminal device 10 and the network device 20 may perform Uu air interface communication. The Uu air interface communication may include uplink transmission and downlink transmission. The uplink transmission may mean that the terminal device 10 sends an uplink signal or uplink information to the network device 20, and the downlink transmission may mean that the network device 20 sends a downlink signal or downlink information to the terminal device 10. A Uu air interface may be understood as a universal UE to network interface. For example, the network device 20 may be an access network device.

In an embodiment, the network architecture shown in FIG. 1 may further include a network management system 30. The terminal device 10 may communicate with the network management system 30 through a wired interface or a wireless interface. For example, the terminal device 10 may communicate with the network management system 30 through the network device 20, or the terminal device 10 may directly communicate with the network management system 30. For example, the network management system 30 may be a network management system operated by an operator.

For the foregoing scenario, there may be a scenario in which uplink transmission and sidelink transmission coexist, that is, an uplink signal and a sidelink signal are simultaneously transmitted on one carrier. How to simultaneously transmit an uplink signal and a sidelink signal on one carrier is a current research focus. A technical problem to be resolved by this application is how to simultaneously transmit an uplink signal and a sidelink signal on one carrier.

The following explains and describes some communication nouns or terms used in this application. The communication nouns or the terms are also used as a part of the content of this application.

1. Terminal Device

A terminal device may be referred to as a terminal for short, and is a device having a wireless transceiver function. The terminal device may be deployed on land, including an indoor device, an outdoor device, a handheld device, or a vehicle-mounted device; or may be deployed on water (for example, on a ship); or may be deployed in the air (for example, on a plane, a balloon, or a satellite). The terminal device may be a mobile phone, a tablet computer (pad), a computer having a wireless transceiver function, a virtual reality (VR) terminal device, an augmented reality (AR) terminal device, a wireless terminal device in industrial control, a wireless terminal device in self driving, a wireless terminal device in telemedicine (remote medical), a wireless terminal device in a smart grid, a wireless terminal device in transportation safety, a wireless terminal device in a smart city, or a wireless terminal device in a smart home, and may further include user equipment (UE) and the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future fifth generation (5G) network, a terminal device in a future evolved public land mobile network (PLMN), or the like. The terminal device sometimes may also be referred to as a terminal device, user equipment (UE), an access terminal device, a vehicle-mounted terminal device, an industrial control terminal device, a UE unit, a UE station, a mobile station, a mobile console, a remote station, a remote terminal device, a mobile device, a UE terminal device, a wireless communications device, a UE agent, a UE apparatus, or the like. The terminal device may be fixed or movable. This is not limited in the embodiments of this application.

In the embodiments of this application, an apparatus configured to implement a terminal function may be a terminal, or may be an apparatus, for example, a chip system, that can support the terminal in implementing the function. The apparatus may be installed in the terminal. In the embodiments of this application, the chip system may include a chip, or may include a chip and another discrete component.

2. Network Device

The network device may be an access network device. The access network device may also be referred to as a radio access network (RAN) device, and is a device that provides a wireless communication function for a terminal device.

For example, the network device includes but is not limited to: a next-generation base station (generation nodeB, gNB) in 5G, an evolved NodeB (eNB), a radio network controller (RNC), a NodeB (NB), a base station controller (BSC), a base transceiver station (BTS), a home base station (for example, a home evolved nodeB or a home node B, HNB), a baseband unit (BBU), a transmission reception point (TRP), a transmitting point (TP), and a mobile switching center. Alternatively, the network device may be a radio controller, a centralized unit (CU), and/or a distributed unit (DU) in a cloud radio access network (CRAN) scenario, or the network device may be a relay station, an access point, a vehicle-mounted device, a terminal device, a wearable device, a network device in a future 5G network, a network device in a future evolved PLMN network, or the like. The terminal device may communicate with a plurality of network devices using different technologies. For example, the terminal device may communicate with a network device supporting long term evolution (LTE), may communicate with a network device supporting 5G, or may implement dual connectivity with a network device supporting LTE and a network device supporting 5G. This is not limited in the embodiments of this application.

In the embodiments of this application, an apparatus configured to implement a network device function may be a network device, or may be an apparatus that can support the network device in implementing the function, for example, a chip system. The apparatus may be installed in the network device.

3. Sidelink (SL)

A sidelink is used for communication between terminal devices, and may include a physical sidelink shared channel (PSSCH) and a physical sidelink control channel (PSCCH). The PSSCH is used to carry sidelink data (SL data), the PSCCH is used to carry sidelink control information (SCI), and the SCI may also be referred to as a sidelink scheduling assignment (SL SA). The SL SA is data scheduling-related information, for example, is used to carry information such as a resource assignment and/or a modulation and coding scheme (MCS) of the PSSCH.

In an embodiment, the sidelink communication may further include a physical sidelink feedback channel (PSFCH). The physical sidelink feedback channel may also be referred to as a sidelink feedback channel for short. The physical sidelink feedback channel may be used to transmit sidelink feedback control information (SFCI), and the sidelink feedback control information may also be referred to as sidelink feedback information for short. The sidelink feedback control information may include one or more pieces of information such as channel state information (CSI) and a hybrid automatic repeat request (HARQ) information. The HARQ information may include acknowledgement (ACK) information, a negative acknowledgement (NACK), or the like.

4. Uu Air Interface

A Uu air interface may be referred to as Uu for short, and the Uu air interface is used for communication between the terminal device and the network device. Transmission over the Uu air interface may include uplink transmission and downlink transmission.

The uplink transmission means that the terminal device sends information to the network device, and the information in the uplink transmission may be referred to as uplink information or an uplink signal. The uplink information or the uplink signal may include one or more of an uplink data signal, an uplink control signal, and a sounding reference signal (SRS). A channel used to transmit uplink information or an uplink signal is referred to as an uplink channel, and the uplink channel may include one or more of a physical uplink data channel (PUSCH) and a physical uplink control channel (PUCCH). The PUSCH is used to carry uplink data, and the uplink data may also be referred to as uplink data information. The PUCCH is used to carry uplink control information (UCI) fed back by the terminal device. For example, the UCI may include one or more of channel state information (CSI), an ACK, a NACK, and the like that are fed back by the terminal device.

The downlink transmission means that the network device sends information to the terminal device, and the information in the downlink transmission may be downlink information or a downlink signal. The downlink information or the downlink signal may include one or more of a downlink data signal, a downlink control signal, a channel state information reference signal (CSI-RS), and a phase tracking reference signal (PTRS). A channel used to transmit downlink information or a downlink signal is referred to as a downlink channel, and the downlink channel may include one or more of a physical downlink data channel (PDSCH) and a physical downlink control channel (PDCCH). The PDCCH is used to carry downlink control information (DCI), and the PDSCH is used to carry downlink data. The downlink data may also be referred to as downlink data information.

5. Transmit Link

A transmit link (Tx chain) may also be referred to as a baseband link, a radio frequency link, a transmission link, a channel bandwidth, or the like.

In an embodiment, the transmit link may include a radio frequency processing link, a base station processing link, or the like.

The terminal device may support a plurality of transmit links. The terminal device may send a signal on one link by using one or more transmit links. For example, the terminal device may support sending of an uplink signal and a sidelink signal on one carrier by using independent transmit links. For example, the terminal device may support sending of an uplink signal by using a first transmit link and sending of a sidelink signal by using a second transmit link on one carrier. For example, the terminal device may support sending of an uplink signal and a sidelink signal on one carrier by using a shared transmit link. For example, the terminal device may support sending of an uplink signal and a sidelink signal on one carrier by using a third transmit link, and the third transmit link is the foregoing shared transmit link.

6. System Parameter

A system parameter may also be referred to as a frame structure parameter (numerology). The system parameter may include one or more of a subcarrier spacing, a cyclic prefix (CP) type, and the like. The CP type may also be referred to as a CP length, or referred to as a CP for short. The CP type may be an extended CP, or a normal CP. A slot with an extended CP may include 12 time domain symbols, and a slot with a normal CP may include 14 time domain symbols. The time domain symbol may be referred to as a symbol for short. The time domain symbol may be an orthogonal frequency division multiplexing (OFDM) symbol, or may be a discrete Fourier transform spread orthogonal frequency division multiplexing (DFT-s-OFDM) symbol. In the embodiments of this application, an example in which the time domain symbol is an OFDM symbol may be used for description.

As shown in Table 1, in an NR system, five system parameters may be supported, and are respectively numbered 0 to 4. System parameters corresponding to the number 0 are: a subcarrier spacing of 15 kHz and a CP being a normal CP. System parameters corresponding to the number 1 are: a subcarrier spacing of 30 kHz and a CP being a normal CP. System parameters corresponding to the number 2 are: a subcarrier spacing of 60 kHz and a CP being a normal CP or an extended CP. System parameters corresponding to the number 3 are: a subcarrier spacing of 120 kHz and a CP being a normal CP. System parameters corresponding to the number 4 are: a subcarrier spacing of 240 kHz and a CP being a normal CP.

TABLE 1

Supported system parameters

| $\mu$ | $\Delta f = 2^\mu \cdot 15$ [kHz] | Cyclic prefix (cyclic prefix, CP) |
|---|---|---|
| 0 | 15 | Normal or normal (normal) |
| 1 | 30 | Normal or normal (normal) |
| 2 | 60 | Normal or normal (normal), extended (extended) |
| 3 | 120 | Normal or normal (normal) |
| 4 | 240 | Normal or normal (normal) |

There may be different slot lengths for different subcarrier spacings. For example, one slot may be 1 millisecond (ms) when a subcarrier spacing is 15 kHz; or one slot may be 0.5 ms when a subcarrier spacing is 30 kHz. One slot may include one or more symbols. For example, a slot with a normal cyclic prefix (CP) may include 14 symbols, and a slot with an extended CP may include 12 symbols. A mini-slot, may be a smaller unit than a slot, and one mini-slot may include one or more symbols. For example, one mini-slot may include two symbols, four symbols, seven symbols, or the like. One slot may include one or more mini-slots.

Figure 2:
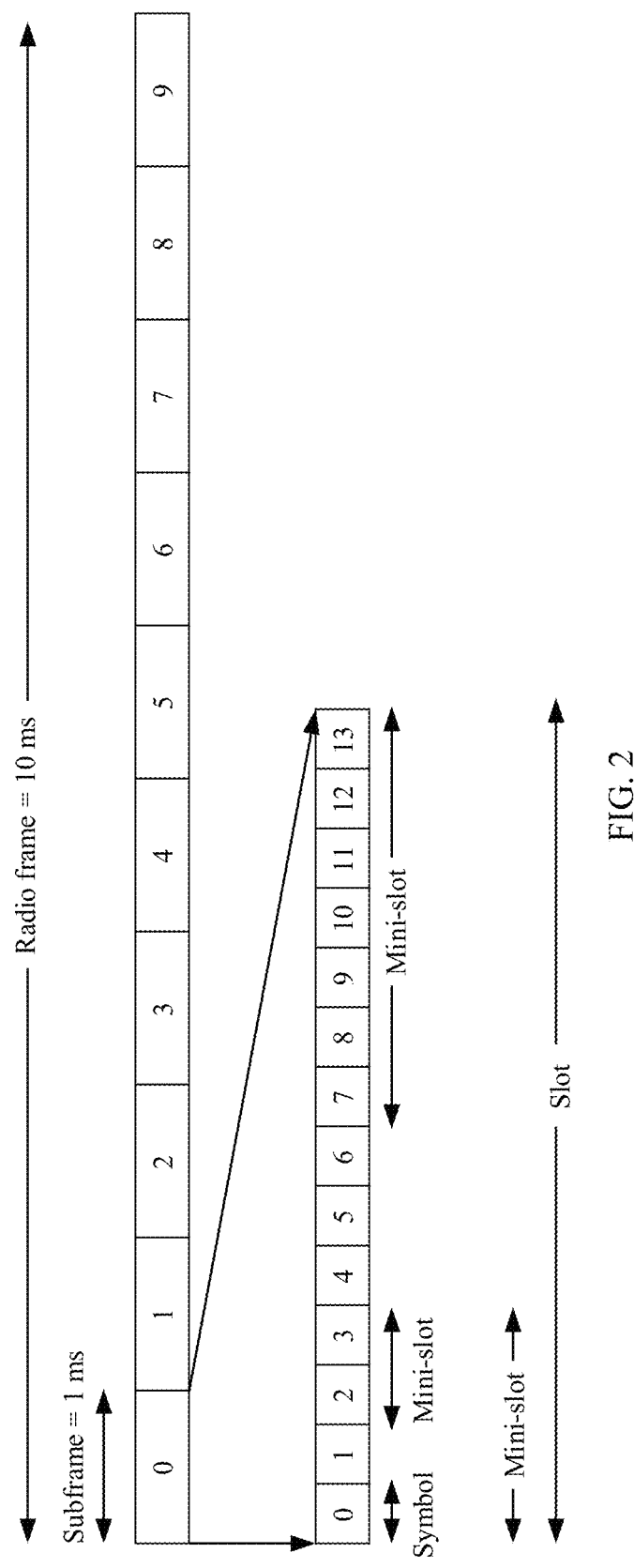
FIG. 2 is a schematic diagram of a time unit according to an embodiment of this application.

As shown in FIG. 2, using a subcarrier spacing of 15 kHz as an example, one radio frame may include 10 subframes, each subframe may include one slot, and each slot may include 14 symbols. One radio frame may last for 10 ms, each subframe may last for 1 ms, and each slot may last for 1 ms. Further, a mini-slot may include four symbols, two symbols, seven symbols, or the like.

Table 2 lists slot features with different system parameters. $N_{symb}^{slot}$ represents a quantity of symbols included in one slot, and a number (or referred to as an index) of the symbol in the slot may range from 0 to $N_{symb}^{slot}-1$. For example, there may be 14 symbols for a normal CP, and there may be 12 symbols for an extended CP. One radio frame may include 10 subframes, one radio frame may be 10 ms, and one subframe may be 1 ms. $N_{slot}^{frame,\mu}$ represents a quantity of slots included in one radio frame in the case of a system parameter $\mu$, and a number (or referred to as an index) $n_s^\mu$ of a slot in the radio frame may range from 0 to $N_{slot}^{frame,\mu}-1$. $N_{slot}^{subframe,\mu}$ represents a quantity of slots included in one subframe in the case of the system parameter $\mu$, and a number of the slot in the subframe may be $n_{s,f}^\mu \in \{0, \ldots, N_{slot}^{frame,\mu}-1\}$.

TABLE 2

Slot feature in the case of a system parameter for a normal CP

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 2-continued

Slot feature in the case of a system parameter for a normal CP

| $\mu$ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |

7. Waveform

A waveform may also be referred to as a modulation and multiple access technology. For example, the waveform may include a single-carrier waveform or a multi-carrier waveform.

In a multi-carrier solution, a used channel bandwidth may be divided into several parallel sub-channels. Ideally, a bandwidth of each sub-channel is non-frequency selective (that is, has a spectral flattening gain). An advantage of the multi-carrier solution is that a receiver can easily compensate for a gain of each sub-channel in frequency domain. For example, orthogonal frequency division multiplexing (OFDM) is a special case of multi-carrier transmission that is very attractive during implementation. A symbol generated in an OFDM system or solution may be referred to as an OFDM symbol.

A single-carrier solution includes a single-carrier frequency division multiple access (SC-FDMA) solution. The SC-FDMA solution may also be referred to as a discrete Fourier transform spread orthogonal frequency division multiplexing (DFT-s-OFDM) solution. The SC-FDMA/DFT-s-OFDM solution combines ideal features of OFDM and features of a low cubic metric (CM) or a low peak to average power ratio (PAPR) of single-carrier transmission. A symbol generated in an SC-FDMA system or solution may be referred to as an SC-FDMA symbol, a DFT-s-OFDM symbol, or a DFT symbol.

Similar to OFDM, in SC-FDMA, a transmission bandwidth is divided into a plurality of parallel subcarriers, and these subcarriers maintain orthogonality in a frequency-selective channel by using cyclic prefixes or guard intervals. However, unlike OFDM in which a data symbol is independently modulated onto each subcarrier, a modulated symbol on each subcarrier in SC-FDMA is a linear combination of data symbols transmitted on all subcarriers at a same moment. In this way, in each SC-FDMA symbol periodicity, all SC-FDMA subcarriers carry a component of each data symbol, so that SC-FDMA has an important feature of a single-carrier system, leading to a CM/PAPR that is far lower than that of a multi-carrier system such as OFDM.

In an embodiment, waveforms may be classified into two types depending on whether transform precoding (transform precoding or transform precoder) is enabled, for example, a transmission/system/solution in which transform precoding is enabled, and a transmission/system/solution in which transform precoding is not enabled. A waveform in which transform precoding is enabled is a single-carrier waveform, and a waveform in which transform precoding is not enabled is a multi-carrier waveform.

8. Carrier Bandwidth Part (BWP)

The carrier bandwidth part may be referred to as a bandwidth part (BWP) for short. The BWP may be a group of contiguous frequency domain resources in a carrier. For example, the BWP may be a group of consecutive resource blocks (RB) in the carrier, or the BWP is a group of consecutive subcarriers in the carrier, or the BWP is a group of consecutive resource block groups (RBG) in the carrier.

One RBG includes at least one RB, for example, one, two, four, six, or eight RBs, and one RB may include at least one subcarrier, for example, 12 subcarriers. In an embodiment, for example, in a method shown in NR Release 15 (Rel-15), in one cell, for a terminal device, a network may configure a maximum of four BWPs for the terminal device. In frequency division duplex (FDD), four BWPs may be configured on each of an uplink and a downlink. In time division duplex (TDD), four BWPs may be configured on each of an uplink and a downlink. For example, center frequency bands of BWPs with a same number are aligned. For each BWP, a network device may configure, for the terminal device, a system parameter that includes a subcarrier spacing and/or a CP length. At any moment, the terminal device may activate one BWP, and the terminal device and the network device transmit and receive data on the active BWP. An existing BWP is defined on a given carrier, that is, a resource of one BWP is located in one carrier resource. Certainly, another definition of a BWP, another BWP activation solution, or the like is not limited in this application.

Figure 3:
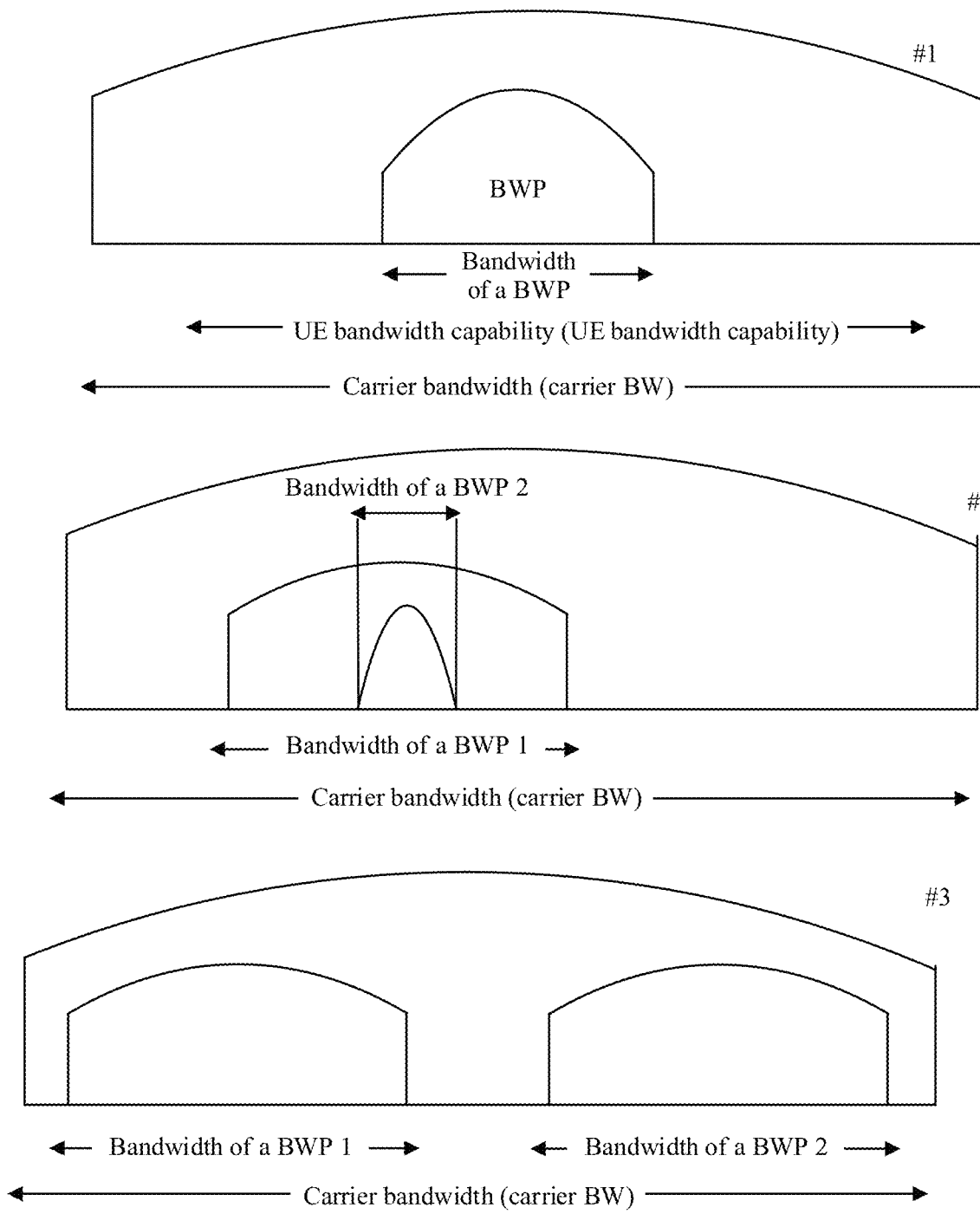
FIG. 3 is a schematic diagram of a BWP configuration according to an embodiment of this application.

As shown by #1 in FIG. 3, in a carrier bandwidth (carrier BW), only one BWP may be configured for one UE. A bandwidth of the BWP may be less than or equal to a UE bandwidth capability, and the UE bandwidth capability may be less than or equal to the carrier bandwidth (carrier BW). As shown by #2 in FIG. 3, in a carrier bandwidth, two BWPs, namely, a BWP 1 and a BWP 2, may be configured for one UE, and a bandwidth of the BWP 1 and a bandwidth of the BWP 2 may overlap. As shown by #3 in FIG. 3, in a carrier bandwidth, two BWPs, namely, a BWP 1 and a BWP 2, may be configured for one UE, and the BWP 1 and the BWP 2 may not overlap. System parameters of the BWP 1 and the BWP 2 may be a same system parameter, or may be different system parameters. In practice, a BWP configuration (for example, a configuration such as a quantity of BWPs, a BWP position, and/or a system parameter of a BWP) may alternatively be another configuration. This is not limited in the embodiments of this application.

9. Time Unit

A time unit may refer to a period of time in time domain, and a unit of the time unit may be a unit such as a radio frame, a subframe, a slot, a mini-slot, or a symbol. For example, in an embodiment, one time unit may include one or more slots. For another example, one radio frame may include one or more subframes, and one subframe may include one or more slots. There may be different slot lengths for different subcarrier spacings. For example, one slot may be 1 millisecond (ms) when a subcarrier spacing is 15 kHz; or one slot may be 0.5 ms when a subcarrier spacing is 30 kHz. One slot may include one or more symbols. For example, a slot with a normal cyclic prefix (CP) may include 14 time domain symbols, and a slot with an extended CP may include 12 time domain symbols. The time domain symbol may be referred to as a symbol for short. The time domain symbol may be an orthogonal frequency division multiplexing (OFDM) symbol, or may be a discrete Fourier transform spread orthogonal frequency division multiplexing (DFT-s-OFDM) symbol. A mini-slot, also referred to as a mini-slot, may be a smaller unit than a slot, and one mini-slot may include one or more symbols. For example, one mini-slot may include two symbols, four symbols, seven symbols, or the like. One slot may include one or more mini-slots.

10. "And/or"

The term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects.

The embodiments of this application are applicable to both a homogeneous network scenario and a heterogeneous network scenario, and no limitation is imposed on a transmission point. Coordinated multipoint transmission may be performed between macro base stations, between micro base stations, or between a macro base station and a micro base station. This application is applicable to both a low-frequency scenario (for example, sub 6G) and a high-frequency scenario (above 6G). It should be noted that the noun "transmission" in this application may include sending and/or receiving (of data and/or control information). The verb "transmit" in this application may include sending and/or receiving. For example, uplink transmission means that the terminal device sends an uplink signal or uplink information to the network device, and sidelink transmission means that the terminal device sends a sidelink signal or sidelink information to another terminal device, or sidelink transmission means that the terminal device receives a sidelink signal or sidelink information sent by another terminal device. Words such as "first" and "second" are merely used for distinction and description, and shall not be understood as an indication or implication of relative importance or an indication or implication of an order.

Figure 4A:
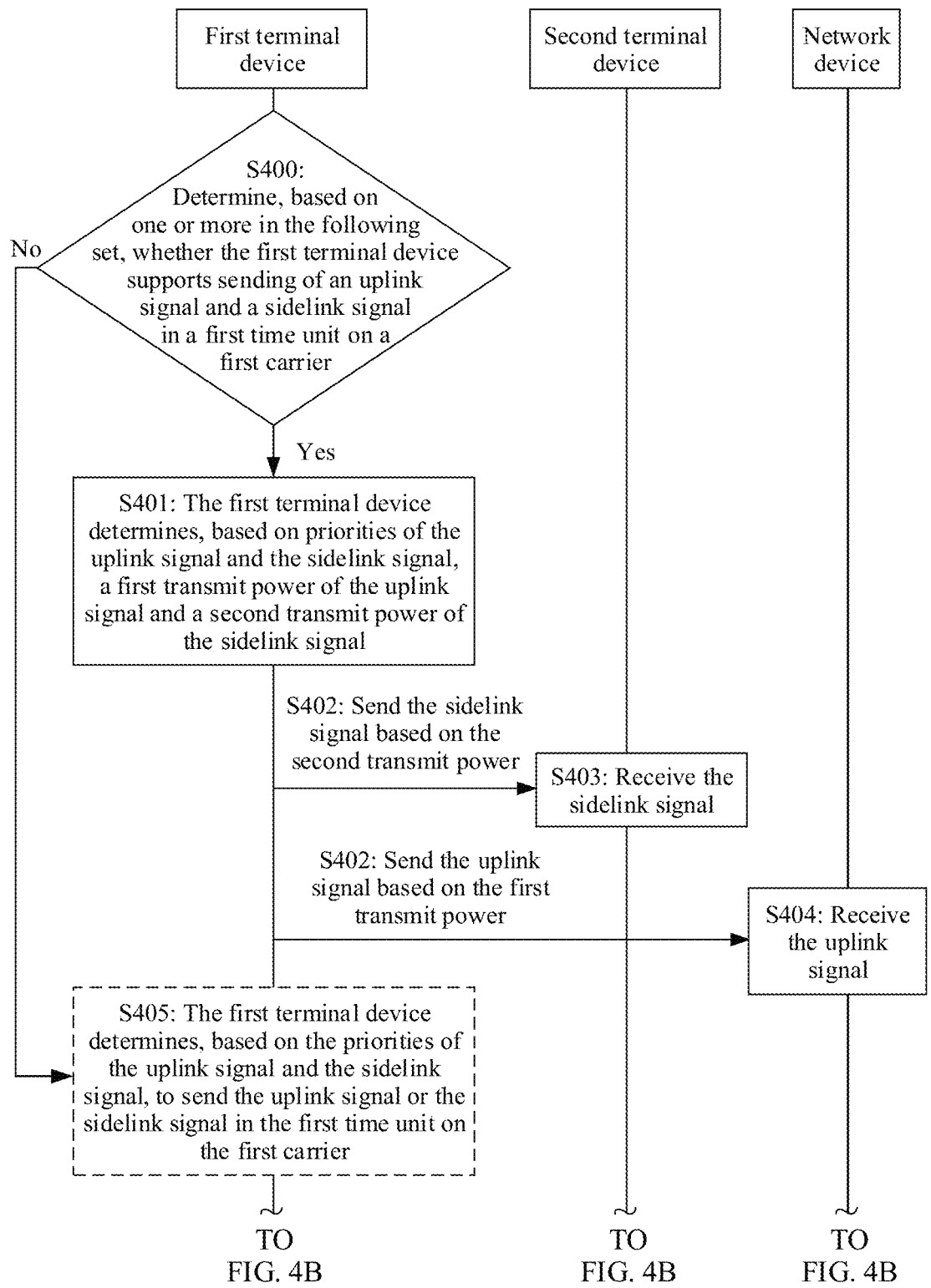
FIG. 4A and FIG. 4B are a schematic flowchart of a communication method according to an embodiment of this application.
Figure 4B:
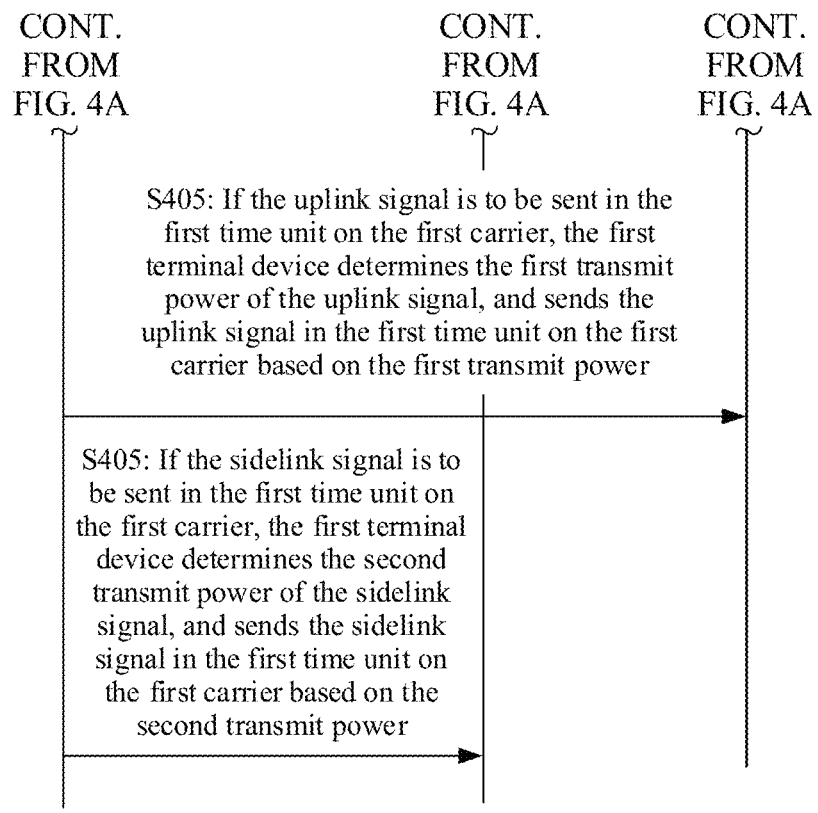

As shown in FIG. 4A and FIG. 4B, this application provides a procedure of a communication method. In the procedure, a network device may be the network device 20 shown in FIG. 1, and a first terminal device or a second terminal device may be the terminal device 10 shown in FIG. 1. The procedure may include the following operations.

S400: The first terminal device determines, based on one or more in a set, whether the first terminal device supports sending of an uplink signal and a sidelink signal in a first time unit on a first carrier. If yes, the following S401 is performed. In an embodiment, if not, the following S405 is performed.

For example, the set may include a transmit link, a system parameter, a waveform, and an inclusion relationship among a bandwidth of a transmit link, a bandwidth of a first BWP, and a bandwidth of a second BWP.

The first BWP may be a BWP used to transmit the uplink signal, and the first BWP may also be referred to as a UL BWP. The second BWP may be a BWP used to transmit the sidelink signal, and the second BWP may also be referred to as an SL BWP.

In an embodiment of the application, supporting sending of the uplink signal and the sidelink signal in the first time unit may also be referred to as supporting simultaneous sending of the uplink signal and the sidelink signal, supporting concurrent sending of the uplink signal and the sidelink signal, or supporting sending of the uplink signal and the sidelink signal at the same time. Alternatively, the uplink signal and the sidelink signal may be sent through frequency division multiplexing.

In an embodiment of the application, not supporting sending of the uplink signal and the sidelink signal in the first time unit may also be referred to as not supporting simultaneous sending of the uplink signal and the sidelink signal, not supporting concurrent sending of the uplink signal and the sidelink signal, or not supporting sending of the uplink signal and the sidelink signal at the same time. Alternatively, the uplink signal and the sidelink signal are sent through time division multiplexing.

A period of time in time domain that corresponds to the first time unit may be one or more slots, one or more mini-slots, one or more symbols, or the like.

In an embodiment of the application, the first terminal device may determine, based on one or more of the following examples, whether the first terminal device supports sending of the uplink signal and the sidelink signal in the first time unit on the first carrier. It may be understood that, in an embodiment of the application, the first terminal device is used as an example to describe the following examples, and is not intended to limit this application. The following examples may alternatively be applied to a terminal device other than the first terminal device and the network device, to determine whether a sending process of the uplink signal and the sidelink signal is supported.

Example 1

The first terminal device may determine, based on the system parameter, whether the first terminal device supports sending of the uplink signal and the sidelink signal in the first time unit on the first carrier.

For example, when a first system parameter of the uplink signal is the same as a second system parameter of the sidelink signal, the first terminal device supports sending of the uplink signal and the sidelink signal in the first time unit on the first carrier. When a first system parameter of the uplink signal is different from a second system parameter of the sidelink signal, the first terminal device does not support sending of the uplink signal and the sidelink signal in the first time unit on the first carrier.

Example 2

The first terminal device may determine, based on the waveform, whether the first terminal device supports sending of the uplink signal and the sidelink signal in the first time unit on the first carrier.

For example, when a first waveform of the uplink signal is the same as a second waveform of the sidelink signal, the first terminal device supports sending of the uplink signal and the sidelink signal in the first time unit on the first carrier. When a first waveform of the uplink signal is different from a second waveform of the sidelink signal, the first terminal device does not support sending of the uplink signal and the sidelink signal in the first time unit on the first carrier.

Example 3

The first terminal device may determine, based on the transmit link, whether the first terminal device supports sending of the uplink signal and the sidelink signal in the first time unit on the first carrier.

Example 3.1: The first terminal device supports use of independent transmit links for uplink transmission and sidelink transmission on the first carrier. For example, the transmit link on the first carrier includes a first transmit link and a second transmit link. The first transmit link may be used to send the uplink signal, and the second transmit link may be used to send the sidelink signal. In this case, when the terminal device supports sending of the uplink signal on the first transmit link and sending of the sidelink signal on the second transmit link, the first terminal device supports sending of the uplink signal and the sidelink signal in the first time unit on the first carrier.

For example, the first transmit link and the second transmit link may be independent. The first transmit link and the second transmit link may support different transmit radio frequency bandwidths, channel bandwidths, or the like. Radio frequency central locations of the first transmit link and the second transmit link may also be independent. In an embodiment, radio frequency central locations of the first transmit link and the second transmit link may be the same.

Figure 5:
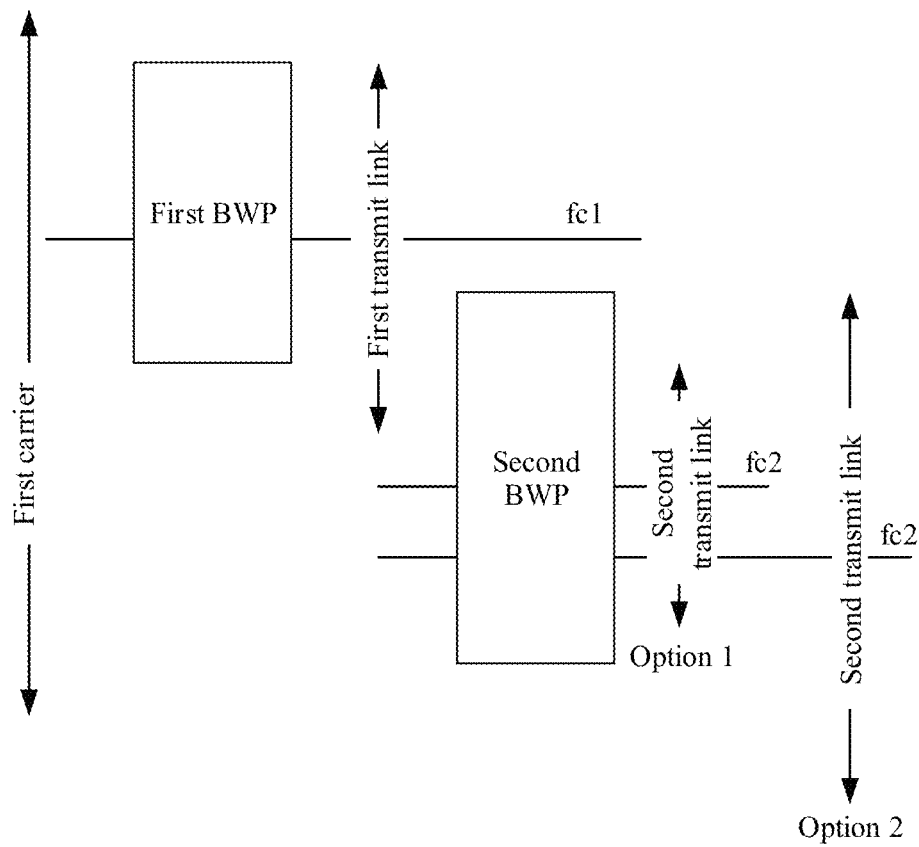
FIG. 5 is a schematic diagram of a transmit link configuration according to an embodiment of this application.

For example, as shown in FIG. 5, on the first carrier, the network device may configure the first BWP and the second BWP for the first terminal device. The first BWP is a BWP used to transmit the uplink signal, and the first BWP may also be referred to as a UL BWP. The second BWP is a BWP used to transmit the sidelink signal, and the second BWP may also be referred to as an SL BWP. For uplink transmission, the first terminal device may use the first transmit link. A bandwidth of the first transmit link is greater than or equal to the bandwidth of the first BWP (in the example shown in FIG. 5, an example in which the bandwidth of the first transmit link is greater than the bandwidth of the first BWP is used for description), and fc1 represents a central location of the first transmit link. For sidelink transmission, the first terminal device may use the second transmit link. A bandwidth of the second transmit link is less than, equal to, or greater than the bandwidth of the second BWP, and fc2 represents a central location of the second transmit link. For example, in FIG. 5, in Option 1, the bandwidth of the second transmit link is less than the bandwidth of the second BWP, and in Option 2, the bandwidth of the second transmit link is greater than the bandwidth of the second BWP.

It should be noted that, in the example shown in FIG. 5, configurations of the first BWP and the second BWP may be independent, and the bandwidth of the first BWP may be the same as or different from the bandwidth of the second BWP. A frequency domain resource occupied by the first BWP may completely overlap, partially overlap, or not overlap a frequency domain resource occupied by the second BWP. A system parameter of the first BWP may be the same as or different from a system parameter of the second BWP. A center frequency of the first BWP may be the same as or different from a center frequency of the second BWP.

Example 3.2: The first terminal device supports use of a shared transmit link for uplink transmission and sidelink transmission on the first carrier. For example, the transmit link on the first carrier includes a third transmit link. The third transmit link is used to transmit the uplink signal and the sidelink signal, and the third transmit link may be referred to as a shared transmit link. In this case, when the first terminal device supports sending of the uplink signal and the sidelink signal on the third transmit link, the first terminal device supports sending of the uplink signal and the sidelink signal in the first time unit on the first carrier, or the first terminal device does not support sending of the uplink signal and the sidelink signal in the first time unit on the first carrier.

In an embodiment, when a shared third transmit link is used for uplink transmission and sidelink transmission, the third transmit link may support one transmit radio frequency bandwidth or channel bandwidth. A center of the third transmit link may alternatively be a center of the transmit radio frequency bandwidth.

Example 4

The first terminal device may determine, based on the transmit link and the system parameter, whether the first terminal device supports sending of the uplink signal and the sidelink signal in the first time unit on the first carrier.

Example 4.1: The first terminal device supports use of independent transmit links for uplink transmission and sidelink transmission on the first carrier. For example, the transmit link on the first carrier includes a first transmit link and a second transmit link. The first transmit link may be used to send the uplink signal, and the second transmit link may be used to send the sidelink signal. In this case, when the first terminal device supports sending of the uplink signal on the first transmit link and sending of the sidelink signal on the second transmit link, and a first system parameter of the uplink signal is the same as a second system parameter of the sidelink signal, the first terminal device supports sending of the uplink signal and the sidelink signal in the first time unit on the first carrier. When the first terminal device supports sending of the uplink signal on the first transmit link and sending of the sidelink signal on the second transmit link, and a first system parameter of the uplink signal is different from a second system parameter of the sidelink signal, the first terminal device does not support sending of the uplink signal and the sidelink signal in the first time unit on the first carrier.

Example 4.2: The first terminal device supports use of a shared transmit link for uplink transmission and sidelink transmission on the first carrier. For example, the transmit link on the first carrier includes a third transmit link. The third transmit link is used to transmit the uplink signal and the sidelink signal, and the third transmit link may be referred to as a shared transmit link. In this case, when the first terminal device supports sending of the uplink signal and the sidelink signal on the third transmit link, and a first system parameter of the uplink signal is the same as a second system parameter of the sidelink signal, the first terminal device supports sending of the uplink signal and the sidelink signal in the first time unit on the first carrier. When the first terminal device supports sending of the uplink signal and the sidelink signal on the third transmit link, and a first system parameter of the uplink signal is different from a second system parameter of the sidelink signal, the first terminal device does not support sending of the uplink signal and the sidelink signal in the first time unit on the first carrier.

It should be noted that the first system parameter of the uplink signal may also be referred to as a system parameter of the first BWP. The first BWP may be an active UL BWP, a working UL BWP, or the like. The system parameter of the first BWP may also be referred to as a system parameter of the active UL BWP, a system parameter of the working UL BWP, or the like. The second system parameter of the sidelink signal may also be referred to as a system parameter of the second BWP. The second BWP may be an active SL BWP or a working SL BWP. The system parameter of the second BWP may also be referred to as a system parameter of the active SL BWP, a system parameter of the working SL BWP, or the like.

Example 5

The first terminal device may determine, based on the transmit link and the waveform, whether the first terminal device supports sending of the uplink signal and the sidelink signal in the first time unit on the first carrier.

Example 5.1: The first terminal device supports use of independent transmit links for uplink transmission and sidelink transmission on the first carrier. For example, the transmit link on the first carrier includes a first transmit link and a second transmit link. The first transmit link may be used to send the uplink signal, and the second transmit link may be used to send the sidelink signal. In this case, when the first terminal device supports sending of the uplink signal on the first transmit link and sending of the sidelink signal on the second transmit link, and a first waveform of the uplink signal is the same as a second waveform of the sidelink signal, the first terminal device supports sending of the uplink signal and the sidelink signal in the first time unit on the first carrier. When the first terminal device supports sending of the uplink signal on the first transmit link and sending of the sidelink signal on the second transmit link, and a first waveform of the uplink signal is different from a second waveform of the sidelink signal, the first terminal device does not support sending of the uplink signal and the sidelink signal in the first time unit on the first carrier.

Example 5.2: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. In this case, when the first terminal device supports sending of the uplink signal and the sidelink signal on the third transmit link, and a first waveform of the uplink signal is the same as a second waveform of the sidelink signal, the first terminal device supports sending of the uplink signal and the sidelink signal in the first time unit on the first carrier. When the first terminal device supports sending of the uplink signal and the sidelink signal on the third transmit link, and a first waveform of the uplink signal is different from a second waveform of the sidelink signal, the first terminal device does not support sending of the uplink signal and the sidelink signal in the first time unit on the first carrier.

It should be noted that the first waveform of the uplink signal may also be referred to as a waveform of uplink signal transmission, or referred to as a waveform of an uplink channel, or the like. The second waveform of the sidelink signal may also be referred to as a waveform of sidelink signal transmission, a waveform of a sidelink channel, or the like.

Example 6

The first terminal device may determine, based on the transmit link, the waveform, and the system parameter, whether the first terminal device supports sending of the uplink signal and the sidelink signal in the first time unit on the first carrier.

Example 6.1: The first terminal device supports use of independent transmit links for uplink transmission and sidelink transmission on the first carrier. For example, the transmit link on the first carrier includes a first transmit link and a second transmit link. The first transmit link may be used to send the uplink signal, and the second transmit link may be used to send the sidelink signal. In this case, when the first terminal device supports sending of the uplink signal on the first transmit link and sending of the sidelink signal on the second transmit link, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier. When the first terminal device supports sending of the uplink signal on the first transmit link and sending of the sidelink signal on the second transmit link, and system parameters and/or waveforms of the uplink signal and the sidelink signal are different, the first terminal device does not support sending of the uplink signal and the sidelink signal in the first time unit on the first carrier.

For example, when the first terminal device supports sending of the uplink signal on the first transmit link and sending of the sidelink signal on the second transmit link, the first system parameter of the uplink signal is different from the second system parameter of the sidelink signal, and the first waveform of the uplink signal is different from the second waveform of the sidelink signal, the first terminal device does not support sending of the uplink signal and the sidelink signal in the first time unit on the first carrier.

For example, when the first terminal device supports sending of the uplink signal on the first transmit link and sending of the sidelink signal on the second transmit link, the first system parameter of the uplink signal is different from the second system parameter of the sidelink signal, and the first waveform of the uplink signal is the same as the second waveform of the sidelink signal, the first terminal device does not support sending of the uplink signal and the sidelink signal in the first time unit on the first carrier.

For example, when the first terminal device supports sending of the uplink signal on the first transmit link and sending of the sidelink signal on the second transmit link, the first waveform of the uplink signal is different from the second waveform of the sidelink signal, and the first system parameter of the uplink signal is the same as the second system parameter of the sidelink signal, the first terminal device does not support sending of the uplink signal and the sidelink signal in the first time unit on the first carrier.

Example 6.2: The first terminal device supports use of a shared transmit link for uplink transmission and sidelink transmission on the first carrier. For example, the transmit link on the first carrier includes a third transmit link. The third transmit link is used to transmit the uplink signal and the sidelink signal, and the third transmit link may be referred to as a shared transmit link. In this case, when the first terminal device supports sending of the uplink signal and the sidelink signal on the third transmit link, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier. When the first terminal device supports sending of the uplink signal and the sidelink signal on the third transmit link, and system parameters of the uplink signal and the sidelink signal and/or waveforms of the uplink signal and the sidelink signal are different, the first terminal device does not support sending of the uplink signal and the sidelink signal in the first time unit on the first carrier.

For example, when the first terminal device supports sending of the uplink signal and the sidelink signal on the third transmit link, the first waveform of the uplink signal is different from the second waveform of the sidelink signal, and the first system parameter of the uplink signal is different from the second system parameter of the sidelink signal, the first terminal device does not support sending of the uplink signal and the sidelink signal in the first time unit on the first carrier.

For example, when the first terminal device supports sending of the uplink signal and the sidelink signal on the third transmit link, the first waveform of the uplink signal is different from the second waveform of the sidelink signal, and the first system parameter of the uplink signal is the same as the second system parameter of the sidelink signal, the first terminal device does not support sending of the uplink signal and the sidelink signal in the first time unit on the first carrier.

For example, when the first terminal device supports sending of the uplink signal and the sidelink signal on the third transmit link, the first waveform of the uplink signal is the same as the second waveform of the sidelink signal, and the first system parameter of the uplink signal is different from the second system parameter of the sidelink signal, the first terminal device does not support sending of the uplink signal and the sidelink signal in the first time unit on the first carrier.

Example 7

The first terminal device may determine, based on the inclusion relationship among the bandwidth of the transmit link, the bandwidth of the first BWP, and the bandwidth of the second BWP, whether the first terminal device supports sending of the uplink signal and the sidelink signal in the first time unit on the first carrier.

The inclusion relationship among the bandwidth of the transmit link, the bandwidth of the first BWP, and the bandwidth of the second BWP in the foregoing set may be a first inclusion relationship, a second inclusion relationship, a third inclusion relationship, a fourth inclusion relationship, a fifth inclusion relationship, a sixth inclusion relationship, or a seventh inclusion relationship.

For example, the first inclusion relationship may be that the bandwidth of the transmit link includes the bandwidth of the first BWP and the bandwidth of the second BWP. The second inclusion relationship may be that the bandwidth of the transmit link includes the bandwidth of the first BWP and a part of the bandwidth of the second BWP, and the part of the bandwidth of the second BWP includes a sending resource pool for a sidelink. The third inclusion relationship may be that the bandwidth of the transmit link does not include the bandwidth of the first BWP. The fourth inclusion relationship may be that the bandwidth of the transmit link does not include a part of the bandwidth of the second BWP, and the part of the bandwidth of the second BWP includes at least one sending resource pool for a sidelink. In an embodiment, the fourth inclusion relationship may alternatively be described as that the bandwidth of the transmit link does not include a sending resource pool of the second BWP. For example, when there is no sending resource pool of the second BWP in a bandwidth resource of the transmit link, the terminal device cannot send the sidelink signal on the first carrier by using the transmit link. The fifth inclusion relationship may be that the bandwidth of the transmit link includes the bandwidth of the first BWP. The sixth inclusion relationship may be that the bandwidth of the transmit link includes the bandwidth of the second BWP. The seventh inclusion relationship may be that the bandwidth of the transmit link includes a part of the bandwidth of the second BWP, and the part of the bandwidth of the second BWP includes at least one sending resource pool for a sidelink.

It should be noted that the first inclusion relationship may also be referred to as that the bandwidth of the first BWP and the bandwidth of the second BWP do not exceed the bandwidth of the transmit link. For example, it may mean that a bandwidth resource of the first BWP and a bandwidth resource of the second BWP are in a bandwidth resource of the transmit link, or it may mean that a frequency domain resource of the first BWP and a frequency domain resource of the second BWP are in a bandwidth resource of the transmit link. The second inclusion relationship may also be referred to as that the bandwidth of the first BWP and the part of the bandwidth of the second BWP do not exceed the bandwidth of the transmit link, and the part of the bandwidth of the second BWP includes at least one sending resource pool for the sidelink. For example, it may mean that a bandwidth resource of the first BWP and a partial bandwidth resource of the second BWP are in a bandwidth resource of the transmit link, or it may mean that a frequency domain resource of the first BWP and a partial frequency domain resource of the second BWP are in a bandwidth resource of the transmit link, and the partial frequency domain resource of the second BWP includes at least one sending resource pool for the sidelink. The third inclusion relationship may also be referred to as that the bandwidth of the first BWP exceeds the bandwidth of the transmit link. For example, it may mean that a part or all of a bandwidth resource of the first BWP is not in a bandwidth resource of the transmit link, or it may mean that a part or all of a frequency domain resource of the first BWP is not in a bandwidth resource of the transmit link. The fourth inclusion relationship may also be referred to as that a part of the bandwidth of the second BWP exceeds the bandwidth of the transmit link, and a partial frequency domain resource of the second BWP includes at least one sending resource pool for the sidelink. For example, it may mean that a part of a partial bandwidth resource of the second BWP is not in a bandwidth resource of the transmit link, and the partial bandwidth resource of the second BWP includes at least one sending resource pool for the sidelink, or it may mean that a part of a partial frequency domain resource of the second BWP is not in a bandwidth resource of the transmit link, and the partial frequency domain resource of the second BWP includes at least one sending resource pool for the sidelink. The fifth inclusion relationship may also be referred to as that the bandwidth of the first BWP does not exceed the bandwidth of the transmit link. For example, it may mean that a bandwidth resource of the first BWP is in a bandwidth resource of the transmit link, or it may mean that a frequency domain resource of the first BWP is in a bandwidth resource of the transmit link. The sixth inclusion relationship may also be referred to as that the bandwidth of the second BWP does not exceed the bandwidth of the transmit link. For example, it may mean that a bandwidth resource of the second BWP is in a bandwidth resource of the transmit link, or it may mean that a frequency domain resource of the second BWP is in a bandwidth resource of the transmit link. The seventh inclusion relationship may also be referred to as that the part of the bandwidth of the second BWP does not exceed the bandwidth of the transmit link, and the part of the bandwidth of the second BWP includes the at least one sending resource pool for the sidelink. For example, it may mean that a partial bandwidth resource of the second BWP is in a bandwidth resource of the transmit link, or it may mean that a partial frequency domain resource of the second BWP is in a bandwidth resource of the transmit link, and the partial frequency domain resource of the second BWP includes at least one sending resource pool for the sidelink.

Figure 6:
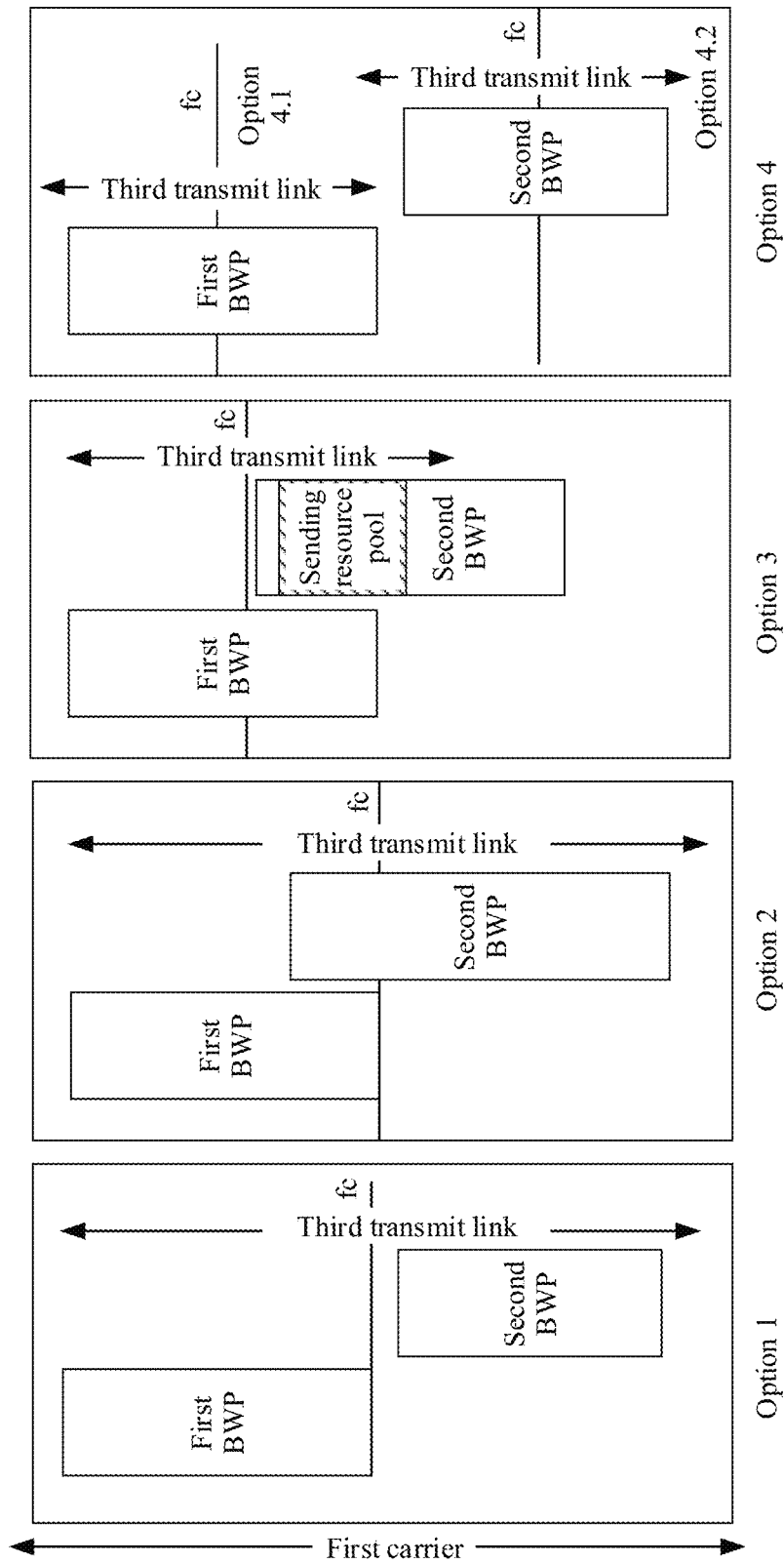
FIG. 6 is a schematic diagram of a transmit link configuration according to an embodiment of this application.

For example, as shown in FIG. 6, on the first carrier, the network device may configure the first BWP and the second BWP for the terminal device. The first BWP may also be referred to as a UL BWP, and the second BWP may also be referred to as an SL BWP. On the first carrier, there may be only one third transmit link for uplink transmission and sidelink transmission. In an embodiment, a bandwidth of the third transmit link may be greater than or equal to the bandwidth of the first BWP, the bandwidth of the third transmit link may be less than, equal to, or greater than the bandwidth of the SL BWP, and fc may represent a central location of the third transmit link. There may be an association relationship or no association relationship between configurations of the first BWP and the second BWP. For example, when a first frame structure parameter of the first BWP is the same as a second frame structure parameter of the second BWP, the bandwidth of the first BWP may be greater than the bandwidth of the second BWP, and a frequency domain resource occupied by the first BWP may include a frequency domain resource occupied by the second BWP; or the bandwidth of the second BWP may be greater than the bandwidth of the first BWP, and a frequency domain resource occupied by the second BWP may include a frequency domain resource occupied by the first BWP. When a first frame structure parameter of the first BWP is different from a second frame structure parameter of the second BWP, the first BWP and the second BWP may be independently configured. The bandwidth of the first BWP may be the same as or different from the bandwidth of the second BWP, the frequency domain resource occupied by the first BWP may completely overlap, partially overlap, or not overlap the frequency domain resource occupied by the second BWP, and so on.

As shown in FIG. 6, an inclusion relationship among the bandwidth of the third transmit link, the bandwidth of the first BWP, and the bandwidth of the second BWP may be discussed in the following options.

Option 1: The bandwidth of the third transmit link includes the bandwidth of the first BWP and the bandwidth of the second BWP, and the bandwidth of the first BWP does not overlap the bandwidth of the second BWP.

Option 2: The bandwidth of the third transmit link includes the bandwidth of the first BWP and the bandwidth of the second BWP, and the bandwidth of the first BWP completely overlaps or partially overlaps the bandwidth of the second BWP (in an example shown in FIG. 6, an example in which the bandwidth of the first BWP partially overlaps the bandwidth of the second BWP is used for description).

Option 3: The bandwidth of the third transmit link includes the bandwidth of the first BWP and a part of the bandwidth of the second BWP, and the part of the bandwidth of the second BWP includes a sending resource pool.

Option 4: The bandwidth of the third transmit link includes only the bandwidth of the first BWP or includes only the bandwidth of the second BWP. For example, in Option 4.1, the bandwidth of the third transmit link includes only the bandwidth of the first BWP. In Option 4.2, the bandwidth of the third transmit link includes only the bandwidth of the second BWP.

It should be noted that the foregoing Option 1 and Option 2 may correspond to the first inclusion relationship, that is, the bandwidth of the third transmit link includes the bandwidth of the first BWP and the bandwidth of the second BWP. The foregoing Option 3 may correspond to the second inclusion relationship, that is, the bandwidth of the third transmit link includes the bandwidth of the first BWP and the part of the bandwidth of the second BWP. The foregoing Option 4 may correspond to the third inclusion relationship and the fourth inclusion relationship. For the third inclusion relationship, the bandwidth of the third transmit link does not include the bandwidth of the first BWP, which may correspond to the foregoing Option 4.2. For the fourth inclusion relationship, the bandwidth of the third transmit link does not include the part of the bandwidth of the second BWP, and the part of the bandwidth of the second BWP includes the at least one resource pool for the sidelink, which may correspond to the foregoing Option 4.1.

Example 7.1: When the inclusion relationship among the bandwidth of the transmit link, the bandwidth of the first BWP, and the bandwidth of the second BWP is the first inclusion relationship, the first terminal device supports sending of the uplink signal and the sidelink signal in the first time unit on the first carrier.

Example 7.2: When the inclusion relationship among the bandwidth of the transmit link, the bandwidth of the first BWP, and the bandwidth of the second BWP is the second inclusion relationship, the first terminal device supports sending of the uplink signal and the sidelink signal in the first time unit on the first carrier.

Example 7.3: When the inclusion relationship among the bandwidth of the transmit link, the bandwidth of the first BWP, and the bandwidth of the second BWP is the third inclusion relationship, the first terminal device does not support sending of the uplink signal and the sidelink signal in the first time unit on the first carrier.

Example 7.4: When the inclusion relationship among the bandwidth of the transmit link, the bandwidth of the first BWP, and the bandwidth of the second BWP is the fourth inclusion relationship, the first terminal device does not support sending of the uplink signal and the sidelink signal in the first time unit on the first carrier.

Example 7.5: When the inclusion relationship among the bandwidth of the transmit link, the bandwidth of the first BWP, and the bandwidth of the second BWP is the fifth inclusion relationship, the first terminal device supports sending of the uplink signal in the first time unit on the first carrier.

Example 7.6: When the inclusion relationship among the bandwidth of the transmit link, the bandwidth of the first BWP, and the bandwidth of the second BWP is the sixth inclusion relationship, the first terminal device supports sending of the sidelink signal in the first time unit on the first carrier.

Example 7.7: When the inclusion relationship among the bandwidth of the transmit link, the bandwidth of the first BWP, and the bandwidth of the second BWP is the seventh inclusion relationship, the first terminal device supports sending of the sidelink signal in the first time unit on the first carrier.

Example 8

The first terminal device determines, based on the transmit link and the inclusion relationship among the bandwidth of the transmit link, the bandwidth of the first BWP, and the bandwidth of the second BWP in the foregoing set, whether the first terminal device supports sending of the uplink signal and the sidelink signal in the first time unit on the first carrier. For the inclusion relationship among the bandwidth of the transmit link, the bandwidth of the first BWP, and the bandwidth of the second BWP, refer to the records in the foregoing Example 7 for details, and descriptions are not provided again in this example.

Example 8.1: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. If an inclusion relationship among a bandwidth of the third transmit link, the bandwidth of the first BWP, and the bandwidth of the second BWP is the first inclusion relationship, the first terminal device supports sending of the uplink signal and the sidelink signal in the first time unit on the first carrier. The foregoing process may also be described as follows: When the first terminal device supports sending of the uplink signal and the sidelink signal on the third transmit link, and the bandwidth of the third transmit link includes the bandwidth of the first BWP and the bandwidth of the second BWP, the first terminal device supports sending of the uplink signal and the sidelink signal in the first time unit on the first carrier.

Example 8.2: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. If an inclusion relationship among a bandwidth of the third transmit link, the bandwidth of the first BWP, and the bandwidth of the second BWP is the second inclusion relationship, the first terminal device supports sending of the uplink signal and the sidelink signal in the first time unit on the first carrier. The foregoing process may also be described as follows: When the first terminal device supports sending of the uplink signal and the sidelink signal on the third transmit link, the bandwidth of the third transmit link includes the bandwidth of the first BWP and a part of the bandwidth of the second BWP, and the part of the bandwidth of the second BWP includes a sending resource pool for the sidelink, the first terminal device supports sending of the uplink signal and the sidelink signal in the first time unit on the first carrier.

Example 8.3: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. If an inclusion relationship among a bandwidth of the third transmit link, the bandwidth of the first BWP, and the bandwidth of the second BWP is the third inclusion relationship, the first terminal device does not support sending of the uplink signal and the sidelink signal in the first time unit on the first carrier. The foregoing process may also be described as follows: When the first terminal device supports sending of the uplink signal and the sidelink signal on the third transmit link, and the bandwidth of the third transmit link does not include the bandwidth of the first BWP, the first terminal device does not support sending of the uplink signal and the sidelink signal in the first time unit on the first carrier.

Example 8.4: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. If an inclusion relationship among a bandwidth of the third transmit link, the bandwidth of the first BWP, and the bandwidth of the second BWP is the fourth inclusion relationship, the first terminal device does not support sending of the uplink signal and the sidelink signal in the first time unit on the first carrier. The foregoing process may also be described as follows: When the first terminal device supports sending of the uplink signal and the sidelink signal on the third transmit link, the bandwidth of the third transmit link does not include a part of the bandwidth of the second BWP, and the part of the bandwidth of the second BWP includes at least one sending resource pool for the sidelink, the first terminal device does not support sending of the uplink signal and the sidelink signal in the first time unit on the first carrier.

Example 8.5: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, and a bandwidth of the second transmit link includes the bandwidth of the second BWP, that is, an inclusion relationship between the bandwidth of the second transmit link and the bandwidth of the second BWP is the sixth inclusion relationship, the first terminal device supports sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes bandwidth of the first BWP, and the bandwidth of the second transmit link includes the bandwidth of the second BWP, the first terminal device does not support sending of the uplink signal and the sidelink signal in the first time unit on the first carrier.

Example 8.6: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, and a bandwidth of the second transmit link includes a part of the bandwidth of the second BWP, that is, an inclusion relationship between the bandwidth of the second transmit link and the bandwidth of the second BWP is the seventh inclusion relationship, the first terminal device supports sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes bandwidth of the first BWP, the bandwidth of the second transmit link includes the part of the bandwidth of the second BWP, and the part of the bandwidth of the second BWP includes at least one sending resource pool for the sidelink, the first terminal device supports sending of the uplink signal and the sidelink signal in the first time unit on the first carrier.

Example 8.7: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link does not include the bandwidth of the first BWP, that is, an inclusion relationship between the bandwidth of the first transmit link and the bandwidth of the first BWP is the third inclusion relationship, or a bandwidth of the second transmit link does not include a part of the bandwidth of the second BWP, and the part of the bandwidth of the second BWP includes at least one sending resource pool for the sidelink, that is, an inclusion relationship between the bandwidth of the second transmit link and the bandwidth of the second BWP is the fourth inclusion relationship, the first terminal device does not support sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link does not include the bandwidth of the first BWP, that is, the inclusion relationship between the bandwidth of the first transmit link and the bandwidth of the first BWP is the third inclusion relationship, and the bandwidth of the second transmit link does not include the part of the bandwidth of the second BWP, and the part of the bandwidth of the second BWP includes the at least one sending resource pool for the sidelink, that is, the inclusion relationship between the bandwidth of the second transmit link and the bandwidth of the second BWP is the fourth inclusion relationship, the first terminal device does not support sending of the uplink signal and the sidelink signal in the first time unit on the first carrier.

Example 9

The first terminal device determines, based on the transmit link, the inclusion relationship among the bandwidth of the transmit link, the bandwidth of the first BWP, and the bandwidth of the second BWP, and the system parameter in the foregoing set, whether the first terminal device supports sending of the uplink signal and the sidelink signal in the first time unit on the first carrier. For the inclusion relationship among the bandwidth of the transmit link, the bandwidth of the first BWP, and the bandwidth of the second BWP, refer to the records in the foregoing Example 7 for details, and descriptions are not provided again in this example.

Example 9.1: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the first inclusion relationship, and a first system parameter of the uplink signal is the same as a second system parameter of the sidelink signal, the first terminal device supports sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and the bandwidth of the second BWP, and the first system parameter of the uplink signal is the same as the second system parameter of the sidelink signal, the first terminal device supports sending of the uplink signal and the sidelink signal in the first time unit on the first carrier.

Example 9.2: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the first inclusion relationship, and a first system parameter of the uplink signal is different from a second system parameter of the sidelink signal, the first terminal device does not support sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and the bandwidth of the second BWP, and the first system parameter of the uplink signal is different from the second system parameter of the sidelink signal, the first terminal device does not support sending of the uplink signal and the sidelink signal in the first time unit on the first carrier.

Example 9.3: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the second inclusion relationship, and a first system parameter of the uplink signal is the same as a second system parameter of the sidelink signal, the first terminal device supports sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and a part of the bandwidth of the second BWP, the part of the bandwidth of the second BWP includes a sending resource pool for the sidelink, and the first system parameter of the uplink signal is the same as the second system parameter of the sidelink signal, the first terminal device supports sending of the uplink signal and the sidelink signal in the first time unit on the first carrier.

Example 9.4: The first terminal device supports use of a shared transmit link for uplink transmission and sidelink transmission on the first carrier. For example, the transmit link on the first carrier includes a third transmit link. The third transmit link is used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the second inclusion relationship, and a first system parameter of the uplink signal is different from a second system parameter of the sidelink signal, the first terminal device does not support sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and a part of the bandwidth of the second BWP, the part of the bandwidth of the second BWP includes a sending resource pool for the sidelink, and the first system parameter of the uplink signal is different from the second system parameter of the sidelink signal, the first terminal device does not support sending of the uplink signal and the sidelink signal in the first time unit on the first carrier.

Example 9.5: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes the bandwidth of the second BWP, that is, an inclusion relationship between the bandwidth of the second transmit link and the bandwidth of the second BWP is the sixth inclusion relationship, and a first system parameter of the uplink signal is the same as a second system parameter of the sidelink signal, the first terminal device supports sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes the bandwidth of the first BWP, that is, the inclusion relationship between the bandwidth of the first transmit link and the bandwidth of the first BWP is the fifth inclusion relationship, the bandwidth of the second transmit link includes the bandwidth of the second BWP, that is, the inclusion relationship between the bandwidth of the second transmit link and the bandwidth of the second BWP is the sixth inclusion relationship, and the first system parameter of the uplink signal is the same as the second system parameter of the sidelink signal, the first terminal device supports sending of the uplink signal and the sidelink signal in the first time unit on the first carrier.

Example 9.6: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes a part of the bandwidth of the second BWP, that is, an inclusion relationship between the bandwidth of the second transmit link and the bandwidth of the second BWP is the seventh inclusion relationship, and a first system parameter of the uplink signal is the same as a second system parameter of the sidelink signal, the first terminal device supports sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes bandwidth of the first BWP, the bandwidth of the second transmit link includes the part of the bandwidth of the second BWP, the part of the bandwidth of the second BWP includes at least one sending resource pool for the sidelink, and the first system parameter of the uplink signal is the same as the second system parameter of the sidelink signal, the first terminal device supports sending of the uplink signal and the sidelink signal in the first time unit on the first carrier.

Example 9.7: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes the bandwidth of the second BWP, that is, an inclusion relationship between the bandwidth of the second transmit link and the bandwidth of the second BWP is the sixth inclusion relationship, and a first system parameter of the uplink signal is different from a second system parameter of the sidelink signal, the first terminal device does not support sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes bandwidth of the first BWP, the bandwidth of the second transmit link includes the bandwidth of the second BWP, and the first system parameter of the uplink signal is different from the second system parameter of the sidelink signal, the first terminal device does not support sending of the uplink signal and the sidelink signal in the first time unit on the first carrier.

Example 9.8: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes a part of the bandwidth of the second BWP, that is, an inclusion relationship between the bandwidth of the second transmit link and the bandwidth of the second BWP is the seventh inclusion relationship, and a first system parameter of the uplink signal is different from a second system parameter of the sidelink signal, the first terminal device does not support sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes bandwidth of the first BWP, the bandwidth of the second transmit link includes the part of the bandwidth of the second BWP, the part of the bandwidth of the second BWP includes at least one sending resource pool for the sidelink, and the first system parameter of the uplink signal is different from the second system parameter of the sidelink signal, the first terminal device does not support sending of the uplink signal and the sidelink signal in the first time unit on the first carrier.

Example 10

The first terminal device determines, based on the transmit link, the inclusion relationship among the bandwidth of the transmit link, the bandwidth of the first BWP, and the bandwidth of the second BWP, and the waveform in the foregoing set, whether the first terminal device supports sending of the uplink signal and the sidelink signal in the first time unit on the first carrier. For the inclusion relationship among the bandwidth of the transmit link, the bandwidth of the first BWP, and the bandwidth of the second BWP, refer to the records in the foregoing Example 7 for details, and descriptions are not provided again in this example.

Example 10.1: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the first inclusion relationship, and a first waveform of the uplink signal is the same as a second waveform of the sidelink signal, the first terminal device supports sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and the bandwidth of the second BWP, and the first waveform of the uplink signal is the same as the second waveform of the sidelink signal, the first terminal device supports sending of the uplink signal and the sidelink signal in the first time unit on the first carrier.

Example 10.2: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the first inclusion relationship, and a first waveform of the uplink signal is different from a second waveform of the sidelink signal, the first terminal device does not support sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and the bandwidth of the second BWP, and the first waveform of the uplink signal is different from the second waveform of the sidelink signal, the first terminal device does not support sending of the uplink signal and the sidelink signal in the first time unit on the first carrier.

Example 10.3: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the second inclusion relationship, and a first waveform of the uplink signal is the same as a second waveform of the sidelink signal, the first terminal device supports sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and a part of the bandwidth of the second BWP, the part of the bandwidth of the second BWP includes a sending resource pool for the sidelink, and the first waveform of the uplink signal is the same as the second waveform of the sidelink signal, the first terminal device supports sending of the uplink signal and the sidelink signal in the first time unit on the first carrier.

Example 10.4: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the second inclusion relationship, and a first waveform of the uplink signal is different from a second waveform of the sidelink signal, the first terminal device does not support sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and a part of the bandwidth of the second BWP, the part of the bandwidth of the second BWP includes a sending resource pool for the sidelink, and the first waveform of the uplink signal is different from the second waveform of the sidelink signal, the first terminal device does not support sending of the uplink signal and the sidelink signal in the first time unit on the first carrier.

Example 10.5: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes the bandwidth of the second BWP, that is, an inclusion relationship between the bandwidth of the second transmit link and the bandwidth of the second BWP is the sixth inclusion relationship, and a first waveform of the uplink signal is the same as a second waveform of the sidelink signal, the first terminal device supports sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes bandwidth of the first BWP, the bandwidth of the second transmit link includes the bandwidth of the second BWP, and the first waveform of the uplink signal is the same as the second waveform of the sidelink signal, the first terminal device supports sending of the uplink signal and the sidelink signal in the first time unit on the first carrier.

Example 10.6: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes a part of the bandwidth of the second BWP, that is, an inclusion relationship between the bandwidth of the second transmit link and the bandwidth of the second BWP is the seventh inclusion relationship, the part of the bandwidth of the second BWP includes at least one sending resource pool for the sidelink, and a first waveform of the uplink signal is the same as a second waveform of the sidelink signal, the first terminal device supports sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes bandwidth of the first BWP, the bandwidth of the second transmit link includes the part of the bandwidth of the second BWP, the part of the bandwidth of the second BWP includes the at least one sending resource pool for the sidelink, and the first waveform of the uplink signal is the same as the second waveform of the sidelink signal, the first terminal device supports sending of the uplink signal and the sidelink signal in the first time unit on the first carrier.

Example 10.7: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes the bandwidth of the second BWP, that is, an inclusion relationship between the bandwidth of the second transmit link and the bandwidth of the second BWP is the sixth inclusion relationship, and a first waveform of the uplink signal is different from a second waveform of the sidelink signal, the first terminal device does not support sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes bandwidth of the first BWP, the bandwidth of the second transmit link includes the bandwidth of the second BWP, and the first waveform of the uplink signal is different from the second waveform of the sidelink signal, the first terminal device does not support sending of the uplink signal and the sidelink signal in the first time unit on the first carrier.

Example 10.8: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes a part of the bandwidth of the second BWP, that is, an inclusion relationship between the bandwidth of the second transmit link and the bandwidth of the second BWP is the seventh inclusion relationship, and a first waveform of the uplink signal is different from a second waveform of the sidelink signal, the first terminal device does not support sending of the uplink signal and the sidelink signal in the first time unit on the first carrier. The foregoing process may also be described as follows: When the first terminal device supports sending of the uplink signal on the first transmit link and sending of the sidelink signal on the second transmit link, the bandwidth of the first transmit link includes bandwidth of the first BWP, the bandwidth of the second transmit link includes the part of the bandwidth of the second BWP, the part of the bandwidth of the second BWP includes at least one sending resource pool for the sidelink, and the first waveform of the uplink signal is different from the second waveform of the sidelink signal, the first terminal device does not support sending of the uplink signal and the sidelink signal in the first time unit on the first carrier.

Example 11

The first terminal device determines, based on the transmit link, the inclusion relationship among the bandwidth of the transmit link, the bandwidth of the first BWP, and the bandwidth of the second BWP, the system parameter, and the waveform in the foregoing set, whether the first terminal device supports sending of the uplink signal and the sidelink signal in the first time unit on the first carrier. For the inclusion relationship among the bandwidth of the transmit link, the bandwidth of the first BWP, and the bandwidth of the second BWP, refer to the records in the foregoing Example 7 for details, and descriptions are not provided again in this example.

Example 11.1: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the first inclusion relationship, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and the bandwidth of the second BWP, the first system parameter of the uplink signal is the same as the second system parameter of the sidelink signal, and the first waveform of the uplink signal is the same as the second waveform of the sidelink signal, the first terminal device supports sending of the uplink signal and the sidelink signal in the first time unit on the first carrier.

Example 11.2: The first terminal device supports use of a shared transmit link for uplink transmission and sidelink transmission on the first carrier. For example, the transmit link on the first carrier includes a third transmit link. The third transmit link may be used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the first inclusion relationship, and system parameters and/or waveforms of the uplink signal and the sidelink signal are different, the first terminal device does not support sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and the bandwidth of the second BWP, and the first system parameter of the uplink signal is different from the second system parameter of the sidelink signal and/or the first waveform of the uplink signal is different from the second waveform of the sidelink signal, the first terminal device does not support sending of the uplink signal and the sidelink signal in the first time unit on the first carrier.

For example, under the precondition that the first terminal device supports sending of the uplink signal and the sidelink signal on the third transmit link, and the bandwidth of the third transmit link includes the bandwidth of the first BWP and the bandwidth of the second BWP, in the following cases, the first terminal device does not support sending of the uplink signal and the sidelink signal in the first time unit on the first carrier:

Case 1. The first system parameter of the uplink signal is different from the second system parameter of the sidelink signal, and the first waveform of the uplink signal is the same as the second waveform of the sidelink signal.

Case 2. The first system parameter of the uplink signal is the same as the second system parameter of the sidelink signal, and the first waveform of the uplink signal is different from the second waveform of the sidelink signal.

Case 3. The first system parameter of the uplink signal is different from the second system parameter of the sidelink signal, and the first waveform of the uplink signal is different from the second waveform of the sidelink signal.

Example 11.3: The first terminal device supports use of a shared transmit link for uplink transmission and sidelink transmission on the first carrier. For example, the transmit link on the first carrier includes a third transmit link. The third transmit link is used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the second inclusion relationship, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and a part of the bandwidth of the second BWP, the part of the bandwidth of the second BWP includes a sending resource pool for the sidelink, the first system parameter of the uplink signal is the same as the second system parameter of the sidelink signal, and the first waveform of the uplink signal is the same as the second waveform of the sidelink signal, the first terminal device supports sending of the uplink signal and the sidelink signal in the first time unit on the first carrier.

Example 11.4: The first terminal device supports use of a shared transmit link for uplink transmission and sidelink transmission on the first carrier. For example, the transmit link on the first carrier includes a third transmit link. The third transmit link is used to transmit the uplink signal and the sidelink signal, and the third transmit link may be referred to as a shared transmit link. When an inclusion relationship among a bandwidth of the third transmit link, the bandwidth of the first BWP, and the bandwidth of the second BWP is the second inclusion relationship, and systems parameters and/or waveforms of the uplink signal and the sidelink signal are different, the first terminal device does not support sending of the uplink signal and the sidelink signal in the first time unit on the first carrier. The foregoing process may also be described as follows: If the first terminal device supports sending of the uplink signal and the sidelink signal on the third transmit link, the bandwidth of the third transmit link includes the bandwidth of the first BWP and a part of the bandwidth of the second BWP, the part of the bandwidth of the second BWP includes a sending resource pool for the sidelink, and the first system parameter of the uplink signal is different from the second system parameter of the sidelink signal and/or the first waveform of the uplink signal is different from the second waveform of the sidelink signal, the first terminal device does not support sending of the uplink signal and the sidelink signal in the first time unit on the first carrier.

For example, under the precondition that the first terminal device supports sending of the uplink signal and the sidelink signal on the third transmit link, and the bandwidth of the third transmit link includes the bandwidth of the first BWP and the part of the bandwidth of the second BWP, in the following cases, the first terminal device does not support sending of the uplink signal and the sidelink signal in the first time unit on the first carrier:

Case 1. The first system parameter of the uplink signal is different from the second system parameter of the sidelink signal, and the first waveform of the uplink signal is the same as the second waveform of the sidelink signal.

Case 2. The first system parameter of the uplink signal is the same as the second system parameter of the sidelink signal, and the first waveform of the uplink signal is different from the second waveform of the sidelink signal.

Case 3. The first system parameter of the uplink signal is different from the second system parameter of the sidelink signal, and the first waveform of the uplink signal is different from the second waveform of the sidelink signal.

Example 11.5: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to send the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes the bandwidth of the second BWP, that is, an inclusion relationship between the bandwidth of the second transmit link and the bandwidth of the second BWP is the sixth inclusion relationship, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier. The foregoing process may also be described as follows: If the first terminal device supports sending of the uplink signal on the first transmit link and sending of the sidelink signal on the second transmit link, the bandwidth of the first transmit link includes the bandwidth of the first BWP, the bandwidth of the second transmit link includes the bandwidth of the second BWP, the first system parameter of the uplink signal is the same as the second system parameter of the sidelink signal, and the first waveform of the uplink signal is the same as the second waveform of the sidelink signal, the first terminal device supports sending of the uplink signal and the sidelink signal in the first time unit on the first carrier.

Example 11.6: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes the bandwidth of the second BWP, that is, an inclusion relationship between the bandwidth of the second transmit link and the bandwidth of the second BWP is the sixth inclusion relationship, and system parameters and/or waveforms of the uplink signal and the sidelink signal are different, the first terminal device does not support sending of the uplink signal and the sidelink signal in the first time unit on the first carrier. The foregoing process may also be described as follows: If the first terminal device supports sending of the uplink signal on the first transmit link and sending of the sidelink signal on the second transmit link, the bandwidth of the first transmit link includes the bandwidth of the first BWP, the bandwidth of the second transmit link includes the bandwidth of the second BWP, and the first system parameter of the uplink signal is different from the second system parameter of the sidelink signal and/or the first waveform of the uplink signal is different from the second waveform of the sidelink signal, the first terminal device does not support sending of the uplink signal and the sidelink signal in the first time unit on the first carrier.

For example, under the precondition that the first terminal device supports sending of the uplink signal and the sidelink signal on the third transmit link, the bandwidth of the first transmit link includes the bandwidth of the first BWP, and the bandwidth of the second transmit link includes the bandwidth of the second BWP, in the following cases, the first terminal device does not support sending of the uplink signal and the sidelink signal in the first time unit on the first carrier:

Case 1. The first system parameter of the uplink signal is different from the second system parameter of the sidelink signal, and the first waveform of the uplink signal is the same as the second waveform of the sidelink signal.

Case 2. The first system parameter of the uplink signal is the same as the second system parameter of the sidelink signal, and the first waveform of the uplink signal is different from the second waveform of the sidelink signal.

Case 3. The first system parameter of the uplink signal is different from the second system parameter of the sidelink signal, and the first waveform of the uplink signal is different from the second waveform of the sidelink signal.

Example 11.7: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes a part of the bandwidth of the second BWP, that is, an inclusion relationship between the bandwidth of the second transmit link and the bandwidth of the second BWP is the seventh inclusion relationship, the part of the bandwidth of the second BWP includes a sending resource pool for the sidelink, a first system parameter of the uplink signal is the same as a second system parameter of the sidelink signal, and a first waveform of the uplink signal is the same as a second waveform of the sidelink signal, the first terminal device supports sending of the uplink signal and the sidelink signal in the first time unit on the first carrier. The foregoing process may also be described as follows: If the first terminal device supports sending of the uplink signal on the first transmit link and sending of the sidelink signal on the second transmit link, the bandwidth of the first transmit link includes the bandwidth of the first BWP, the bandwidth of the second transmit link includes the part of the bandwidth of the second BWP, the part of the bandwidth of the second BWP includes the sending resource pool for the sidelink, the first system parameter of the uplink signal is the same as the second system parameter of the sidelink signal, and the first waveform of the uplink signal is the same as the second waveform of the sidelink signal, the first terminal device supports sending of the uplink signal and the sidelink signal in the first time unit on the first carrier.

Example 11.8: The first terminal device supports use of independent transmit links for uplink transmission and sidelink transmission on the first carrier. For example, the transmit link on the first carrier includes a first transmit link and a second transmit link. The first transmit link may be used to transmit the uplink signal, and the second transmit link may be used to transmit the sidelink signal. When a bandwidth of the first transmit link includes the bandwidth of the first BWP, that is, an inclusion relationship between the bandwidth of the first transmit link and the bandwidth of the first BWP is the fifth inclusion relationship, a bandwidth of the second transmit link includes a part of the bandwidth of the second BWP, that is, an inclusion relationship between the bandwidth of the second transmit link and the bandwidth of the second BWP is the seventh inclusion relationship, and system parameters and/or waveforms of the uplink signal and the sidelink signal are different, the first terminal device does not support sending of the uplink signal and the sidelink signal in the first time unit on the first carrier. The foregoing process may also be described as follows: If the first terminal device supports sending of the uplink signal on the first transmit link and sending of the sidelink signal on the second transmit link, the bandwidth of the first transmit link includes the bandwidth of the first BWP, the bandwidth of the second transmit link includes the part of the bandwidth of the second BWP, and the first system parameter of the uplink signal is different from the second system parameter of the sidelink signal and/or the first waveform of the uplink signal is different from the second waveform of the sidelink signal, the first terminal device does not support sending of the uplink signal and the sidelink signal in the first time unit on the first carrier.

For example, under the precondition that the first terminal device supports sending of the uplink signal on the first transmit link and sending of the sidelink signal on the second transmit link, the bandwidth of the first transmit link includes the bandwidth of the first BWP, and the bandwidth of the second transmit link includes the part of the bandwidth of the second BWP, in the following cases, the first terminal device does not support sending of the uplink signal and the sidelink signal in the first time unit on the first carrier:

Case 1. The first system parameter of the uplink signal is different from the second system parameter of the sidelink signal, and the first waveform of the uplink signal is the same as the second waveform of the sidelink signal.

Case 2. The first system parameter of the uplink signal is the same as the second system parameter of the sidelink signal, and the first waveform of the uplink signal is different from the second waveform of the sidelink signal.

Case 3. The first system parameter of the uplink signal is different from the second system parameter of the sidelink signal, and the first waveform of the uplink signal is different from the second waveform of the sidelink signal.

It should be noted that, in the foregoing example, whether the first terminal device supports sending of the uplink signal and the sidelink signal in the first time unit on the first carrier may also be referred to as whether the first terminal device supports simultaneous sending of the uplink signal and the sidelink signal on the first carrier. That the first terminal device supports sending of the uplink signal and the sidelink signal in the first time unit on the first carrier may also be referred to as that the first terminal device supports simultaneous sending of the uplink signal and the sidelink signal on the first carrier. That the first terminal device does not support sending of the uplink signal and the sidelink signal in the first time unit on the first carrier may also be referred to as that the first terminal device does not support simultaneous sending of the uplink signal and the sidelink signal on the first carrier.

S401: The first terminal device determines, based on priorities of the uplink signal and the sidelink signal, a first transmit power of the uplink signal and a second transmit power of the sidelink signal.

For example, if the priority of the uplink signal is higher than the priority of the sidelink signal, the second transmit power of the sidelink signal may be adjusted based on the first transmit power of the uplink signal. That is, the transmit power of the uplink signal is preferentially ensured, and the transmit power of the sidelink signal is reduced, or sending of the sidelink signal is abandoned. It may be understood that when the transmit power of the sidelink signal is adjusted to zero, it may be considered that sending of the sidelink signal is abandoned. If the priority of the sidelink signal is higher than the priority of the uplink signal, the first transmit power of the uplink signal may be adjusted based on the second transmit power of the sidelink signal. That is, the transmit power of the sidelink signal is preferentially ensured, and the transmit power of the uplink signal is reduced, or sending of the uplink signal is abandoned. It may be understood that when the transmit power of the uplink signal is adjusted to zero, it may be considered that sending of the uplink signal is abandoned. In the descriptions of an embodiment of the application, abandonment of sending of a signal or information may also be referred to as discarding of the signal or the information. For example, abandonment of sending of the sidelink signal may also be referred to as discarding of the sidelink signal, and abandonment of sending of the uplink signal may also be referred to as discarding of the uplink signal.

S402: The first terminal device sends the uplink signal based on the first transmit power, and/or sends the sidelink signal based on the second transmit power.

For example, the first terminal device may send the uplink signal at the first transmit power, and/or send the sidelink signal at the second transmit power in the first time unit on the first carrier.

Example 1: When the first transmit power and the second transmit power are both non-zero, that the first terminal device may send the uplink signal at the first transmit power and send the sidelink signal at the second transmit power in the first time unit on the first carrier may also be referred to as that the first terminal device simultaneously sends the uplink signal and the sidelink signal on the first carrier.

Example 2: When the first transmit power is zero, that the first terminal device may send only the sidelink signal at the second transmit power in the first time unit on the first carrier may also be referred to as that the first terminal device sends only the sidelink signal on the first carrier.

Example 3: When the second transmit power is zero, that the first terminal device may send only the uplink signal at the first transmit power in the first time unit on the first carrier may also be referred to as that the first terminal device sends only the uplink signal on the first carrier.

In an embodiment, the procedure shown in FIG. 4A and FIG. 4B may further include the following operation: S403: The second terminal device receives the sidelink signal.

Further, after receiving the sidelink signal, the second terminal device may process the sidelink signal, for example, perform operations such as decoding and/or parsing of the sidelink signal.

In an embodiment, the procedure shown in FIG. 4A and FIG. 4B may further include the following operation: S404: The network device receives the uplink signal. Further, after receiving the uplink signal, the network device may process the uplink signal, for example, perform operations such as decoding and/or parsing of the uplink signal.

As described above, the procedure shown in FIG. 4A and FIG. 4B further includes the following optional operation:

S405: The first terminal device determines, based on the priorities of the uplink signal and the sidelink signal, to send the uplink signal or the sidelink signal in the first time unit on the first carrier. If the uplink signal is to be sent in the first time unit on the first carrier, the first terminal device determines the first transmit power of the uplink signal, and sends the uplink signal to the network device in the first time unit on the first carrier based on the first transmit power. If the sidelink signal is to be sent in the first time unit on the first carrier, the first terminal device determines the second transmit power of the sidelink signal, and sends the sidelink signal to the second terminal device in the first time unit on the first carrier based on the second transmit power.

In an example, if the priority of the uplink signal is higher than the priority of the sidelink signal, the first terminal device sends the uplink signal at the first transmit power in the first time unit on the first carrier. If the priority of the sidelink signal is higher than the priority of the uplink signal, the first terminal device sends the sidelink signal at the second transmit power in the first time unit on the first carrier.

In an embodiment, in the procedure shown in FIG. 4A and FIG. 4B, the first terminal device may report a first capability to the network device, and the network device may perform resource allocation, resource scheduling, or the like for the first terminal device based on the first capability reported by the first terminal device. The first capability may mean that the first terminal device has a capability of whether sending of the uplink signal and the sidelink signal in the first time unit on the first carrier is supported. For example, if the first terminal device supports sending of the uplink signal and the sidelink signal in the first time unit on the first carrier, the first capability may be represented by a bit 1. If the first terminal device does not support sending of the uplink signal and the sidelink signal in the first time unit on the first carrier, the first capability may be represented by a bit 0.

In an embodiment, for the foregoing examples of whether the first terminal device supports sending of the uplink signal and the sidelink signal in the first time unit on the first carrier, the first terminal device may report a supported example or supported examples.

For example, the first terminal device may report a capability of supporting one or more of Example 1 to Example 11.

In an embodiment, the network device may determine, based on the capability reported by the first terminal device, whether the terminal device supports sending of the uplink signal and the sidelink signal in the first time unit on the first carrier.

The following describes an embodiment in which the first terminal device determines, based on the priorities of the uplink signal and the sidelink signal, the first transmit power of the uplink signal and the second transmit power of the sidelink signal in S401, which may be but is not limited to the solutions recorded in the following examples.

Optionally, an embodiment of the application may be used as an independent embodiment, or may be combined with another embodiment. This is not limited in this application.

In an embodiment, the terminal device and/or the network device may determine the priorities of the uplink signal and the sidelink signal based on one or more of the following examples.

Optionally, in an embodiment of the application, the uplink signal may include data information and/or feedback information, and the sidelink signal may include data information and/or feedback information.

That the uplink signal includes the data information may also be referred to as that the uplink signal is the data information. For example, the uplink signal may refer to data information in uplink transmission.

That the uplink signal includes the feedback information may also be referred to as that the uplink signal is the feedback information. For example, the uplink signal may refer to feedback information in uplink transmission.

That the sidelink signal includes the data information may also be referred to as that the sidelink signal is the data information. For example, the sidelink signal may refer to data information in sidelink transmission.

That the sidelink signal includes the feedback information may also be referred to as that the sidelink signal is the feedback information. For example, the sidelink signal may refer to feedback information in sidelink transmission.

Example 1

A priority of the feedback information is higher than a priority of the data information. In an embodiment of the application, the priorities of the uplink signal and the sidelink signal are determined in the following scenarios: In an embodiment, the feedback information may include but is not limited to one or more of the following: CSI feedback information, HARQ feedback information, resource request information, a PUCCH, a PSFCH, UCI transmission in a PUSCH (PUSCH with UCI), SFI transmission in a PSSCH (PSSCH with SFI), and the like. The data information may include but is not limited to one or more of the following: data, a PUSCH, and the like.

In an embodiment, the terminal device and/or the network device may determine the priorities of the uplink signal and the sidelink signal based on one or more of the following scenarios:

Scenario 1: If the uplink signal includes data information, and the sidelink signal includes feedback information, the priority of the sidelink signal is higher than the priority of the uplink signal.

For the foregoing Scenario 1, the uplink signal including the data information may be represented as UL data, and the sidelink signal including the feedback information may be represented as an SL feedback. If a priority of the SL feedback is higher than a priority of the UL data, a transmit power of the UL data may be adjusted based on a transmit power of the SL feedback. That is, transmission of the SL feedback may be preferentially ensured, and the transmit power of the UL data is adjusted based on the transmit power of the SL feedback, or transmission of the UL data is abandoned.

Scenario 2: If the uplink signal includes feedback information, and the sidelink signal includes data information, the priority of the uplink signal is higher than the priority of the sidelink signal.

For the foregoing Scenario 2, the uplink signal including the feedback information may be represented as a UL feedback, and the sidelink signal including the data information may be represented as SL data. If a priority of the UL feedback is higher than a priority of the SL data, a transmit power of the SL data may be adjusted based on a transmit power of the UL feedback. That is, transmission of the UL feedback may be preferentially ensured, and the transmit power of the SL data is adjusted based on the transmit power of the UL feedback, or transmission of the SL data is abandoned.

Scenario 3: If the uplink signal includes feedback information, and the sidelink signal includes feedback information, when a priority of the feedback information in the sidelink signal is less than (or less than or equal to) a first threshold, the priority of the sidelink signal is higher than the priority of the uplink signal. When a priority of the feedback information in the sidelink signal is greater than or equal to (or greater than) a first threshold, the priority of the uplink signal is higher than the priority of the sidelink signal.

In an embodiment, the first threshold is a threshold used to determine the priorities of the sidelink signal and the uplink signal in the case of the feedback information. Alternatively, it may also be referred to as that the first threshold is a threshold used to determine the priority of the feedback information.

For example, for each data packet of feedback information on a sidelink, a priority of the data packet may be set. The priority of the data packet may be referred to as a proximity-based service per-packet priority (PPPP), and the proximity-based service may also be referred to as short-distance communication or sidelink communication. The short-distance communication or the sidelink communication refers to communication between terminal devices.

It should be noted that, in an embodiment of the application, the priority of the data packet may be a parameter used to measure quality of service of the data packet. For example, the priority of the data packet may be a quality of service (QoS) parameter. For example, the parameter in an embodiment of the application may be a parameter such as a PPPP, a 5G QoS identifier (5QI), or a V2X 5QI (which may be referred to as a VQI for short).

It may be understood that the priority of the data packet may be represented by a value, and the value may be an integer or a real number. In an example, a priority of a data packet may be represented by a positive integer from 1 to 8.

It should be noted that, in an embodiment of the application, an example in which the priority of the data packet is a PPPP is used for description, and other parameters are similar to this. Specifically, details are not described in this application.

In an embodiment, the data packet of the feedback information may be a data packet corresponding to the feedback information. The priority of the data packet of the feedback information may be the same as or different from a priority of a first data packet. For example, the first terminal device sends the first data packet to the second terminal device, where the priority of the first data packet is PS1. After receiving the first data packet, the second terminal device may send feedback information to the first terminal device, where a priority of the data packet of the feedback information may be PS1. Alternatively, the priority of the data packet of the feedback information may be PS2, and a value of PS2 may be notified by the network device to the terminal device, or may be predefined in a protocol. The data packet of the feedback information may also be referred to as a feedback information data packet for short.

In an embodiment, the priority of the feedback information may be the priority of the data packet of the feedback information, or may be a priority corresponding to the feedback information. The priority corresponding to the feedback information may be the same as or different from the priority of the data packet of the feedback information. For example, the feedback information may alternatively correspond to a priority. For example, the priority corresponding to the feedback information may be PS3. A value of PS3 may be notified by the network device to the terminal device, or may be predefined in a protocol. Specifically, this is not limited in this application.

In an embodiment, values of PS1, PS2, and PS3 may be positive integers, integers, or other real numbers.

In an example, if the PPPP of the data packet of the feedback information is less than the first threshold, the priority of the sidelink signal is higher than the priority of the uplink signal; otherwise, it is determined that the priority of the uplink signal is higher than the priority of the sidelink signal. Alternatively, if the PPPP of the data packet of the feedback information is less than or equal to the first threshold, the priority of the sidelink signal is higher than the priority of the uplink signal; otherwise, it is determined that the priority of the uplink signal is higher than the priority of the sidelink signal. The first threshold may also be referred to as PPPP1, and a value of the first threshold may be a positive integer, an integer, or another real number. For example, the value of the first threshold may be an integer from 0 to 7 and including 0 and 7. Alternatively, the value of the first threshold may be a positive integer from 1 to 8 and including 1 and 8.

For example, when a value of PPPP1 is p1 and the PPPP of the data packet of the feedback information is p2, if p2<p1, the priority of the sidelink signal is higher than the priority of the uplink signal; or if p2>p1, the priority of the uplink signal is higher than the priority of the sidelink signal.

For the foregoing Scenario 3, the uplink signal including the feedback information may be represented as a UL feedback, and the sidelink signal including the feedback information may be represented as an SL feedback. If a priority of the UL feedback is higher than a priority of the SL feedback, a transmit power of the SL feedback may be adjusted based on a transmit power of the UL feedback. That is, transmission of the UL feedback may be preferentially ensured, and the transmit power of the SL feedback is adjusted based on the transmit power of the UL feedback, or transmission of the SL feedback is abandoned. Alternatively, if a priority of the SL feedback is higher than a priority of the UL feedback, a transmit power of the UL feedback may be adjusted based on a transmit power of the SL feedback. That is, transmission of the SL feedback may be preferentially ensured, and the transmit power of the UL feedback is adjusted based on the transmit power of the SL feedback, or transmission of the UL feedback is abandoned.

Scenario 4: If the sidelink signal includes data information, and the uplink signal includes data information, when a priority of the data information in the sidelink signal is less than (or less than or equal to) a second threshold, the priority of the sidelink signal is higher than the priority of the uplink signal. When a priority of the data information in the sidelink signal is greater than or equal to (or greater than) the second threshold, the priority of the uplink signal is higher than the priority of the sidelink signal.

In an embodiment, the second threshold is a threshold used to determine the priorities of the sidelink signal and the uplink signal in the case of the data information. Alternatively, it may also be referred to as that the first threshold is a threshold used to determine the priority of the data information.

For example, for a data packet of each piece of data information in the sidelink signal, a priority of the data packet may be set, and the priority of the data packet may be referred to as a PPPP.

In an embodiment, the priority of the data information may be a priority of a data packet corresponding to the data information. For example, the first terminal device sends data information to the second terminal device, where a priority of a data packet corresponding to the data information is PS1; in this case, a priority of the data information is PS1. The priority of the data packet of the data information may also be referred to as the priority of the data information for short.

In an example, if a PPPP of the data packet of the data information is less than the second threshold, the priority of the sidelink signal is higher than the priority of the uplink signal; otherwise, it is determined that the priority of the uplink signal is higher than the priority of the sidelink signal. Alternatively, if a PPPP of the data packet of the data information is less than or equal to the second threshold, the priority of the sidelink signal is higher than the priority of the uplink signal; otherwise, it is determined that the priority of the uplink signal is higher than the priority of the sidelink signal. The second threshold may also be referred to as PPPP2, and a value of the second threshold may be a positive integer, an integer, or another real number. For example, the value of the second threshold may be an integer from 0 to 4 and including 0 and 4, and a value of the first threshold may be a positive integer from 1 to 8 and including 1 and 8.

For example, when a value of PPPP2 is p3 and the PPPP of the data packet of the data information is p4, if p4<p3, the priority of the sidelink signal is higher than the priority of the uplink signal; or if p4>p3, the priority of the uplink signal is higher than the priority of the sidelink signal.

Optionally, in an embodiment of the application, the first threshold or the second threshold may be predefined, or indicated by the network device. For example, the network device may separately indicate the first threshold and the second threshold. For example, the network device sends a first indication and a second indication to the first terminal device, where the first indication is used to indicate the first threshold, and the second indication is used to indicate the second threshold. For example, the network device may indicate the first threshold and a first difference, where the first difference may be a difference between the first threshold and the second threshold, and the first terminal device may determine the second threshold based on the first threshold and the first difference. For example, if the first difference=the second threshold−the first threshold, the second threshold=the first threshold+the first difference. Alternatively, if the first difference=the first threshold−the second threshold, the second threshold=the first threshold−the first difference. For example, the network device may indicate the second threshold and the first difference. The first terminal device may determine the first threshold based on the second threshold and the first difference. For example, if the first difference=the second threshold−the first threshold, the first threshold=the second threshold−the first difference. Alternatively, if the first difference=the first threshold−the second threshold, the first threshold=the second threshold+the first difference.

For the foregoing Scenario 4, the sidelink signal including the data information may be represented as SL data, and the uplink signal including the data information may be represented as UL data. If a priority of the SL data is higher than a priority of the UL data, a transmit power of the UL data may be adjusted based on a transmit power of the SL data. That is, transmission of the SL data may be preferentially ensured, and the transmit power of the UL data is adjusted based on the transmit power of the SL data, or transmission of the UL data is abandoned. If a priority of the UL data is higher than a priority of the SL data, a transmit power of the SL data may be adjusted based on a transmit power of the UL data. That is, transmission of the UL data may be preferentially ensured, and the transmit power of the SL data is adjusted based on the transmit power of the UL data, or transmission of the SL data is abandoned.

Example 2

If both the uplink signal and the sidelink signal include feedback information or both include data information, but types of the feedback information corresponding to the uplink signal and the sidelink information are different, or types of the data information corresponding to the uplink signal and the sidelink signal are different, the priorities of the uplink signal and the sidelink signal are determined based on different types of information included in the uplink signal and the sidelink signal.

It may be understood that, in the following scenarios, an example in which a priority of the feedback information or the data information corresponding to the sidelink signal is compared with a threshold to determine the priorities of the uplink signal and the sidelink signal is used for description. This is not intended to limit this application. Optionally, in an embodiment of the application, a priority of the feedback information or the data information corresponding to the uplink signal may be compared with a threshold to determine the priorities of the uplink signal and the sidelink signal.

Specifically, there may be the following scenarios:

Scenario 1: Both the uplink signal and the sidelink signal include feedback information, types of the feedback information corresponding to the uplink signal and the sidelink information are different, and the different types of feedback information may have different priorities. For example, the uplink signal includes first-type feedback information, and the sidelink signal includes second-type feedback information. If a priority of the first-type feedback information is higher than a priority of the second-type feedback information, the priority of the uplink signal is higher than the priority of the sidelink signal. If a priority of the second-type feedback information is higher than a priority of the first-type feedback information, the priority of the sidelink signal is higher than the priority of the uplink signal.

Scenario 2: Both the uplink signal and the sidelink signal include data information, types of data information corresponding to the uplink signal and the sidelink signal are different, and the different types of data information may have different priorities. For example, the uplink signal includes first-type data information, and the sidelink signal includes second-type data information. If a priority of the first-type data information is higher than a priority of the second-type data information, the priority of the uplink signal is higher than the priority of the sidelink signal. If a priority of the second-type data information is higher than a priority of the first-type data information, the priority of the sidelink signal is higher than the priority of the uplink signal.

Scenario 3: The uplink signal and the sidelink signal both include feedback information, and the uplink signal and the sidelink signal correspond to a same type of feedback information and both include third-type feedback information. If a priority of the third-type feedback information is less than (or less than or equal to) a third threshold, the priority of the sidelink signal is higher than the priority of the uplink signal. If a priority of the third-type feedback information is greater than or equal to (or greater than) a third threshold, the priority of the uplink signal is higher than the priority of the sidelink signal.

The third threshold may be the same as or different from the first threshold. For example, the first threshold is applicable to all feedback information types, or for the third threshold, different feedback information types may correspond to different threshold values. A value of the third threshold may be a positive integer, an integer, or another real number.

For example, a value of a third threshold for first-type feedback information may be PF1, a value of a third threshold for second-type feedback information may be PF2, a value of a third threshold for third-type feedback information may be PF3, and so on. Values of PF1, PF2, and PF3 may be the same or different.

For example, when the uplink signal and the sidelink signal both include first-type feedback information, if a priority of the first-type feedback information corresponding to the sidelink signal is less than (or less than or equal to) PF1, the priority of the sidelink signal is higher than the priority of the uplink signal. Alternatively, if a priority of the first-type feedback information corresponding to the sidelink signal is greater than or equal to (or greater than) PF1, the priority of the uplink signal is higher than the priority of the sidelink signal.

For example, when the uplink signal and the sidelink signal both include second-type feedback information, if a priority of the second-type feedback information corresponding to the sidelink signal is less than (or less than or equal to) PF2, the priority of the sidelink signal is higher than the priority of the uplink signal. Alternatively, if a priority of the second-type feedback information corresponding to the sidelink signal is greater than or equal to (or greater than) PF2, the priority of the uplink signal is higher than the priority of the sidelink signal.

For example, when the uplink signal and the sidelink signal both include third-type feedback information, if a priority of the third-type feedback information corresponding to the sidelink signal is less than (or less than or equal to) PF3, the priority of the sidelink signal is higher than the priority of the uplink signal. Alternatively, if a priority of the third-type feedback information corresponding to the sidelink signal is greater than or equal to (or greater than) PF3, the priority of the uplink signal is higher than the priority of the sidelink signal.

Scenario 4: The uplink signal and the sidelink signal both include data information, and the uplink signal and the sidelink signal correspond to a same type of data information and both include third-type data information. If a priority of the third-type data information is less than (or less than or equal to) a fourth threshold, the priority of the sidelink signal is higher than the priority of the uplink signal. Alternatively, if a priority of the third-type data information is greater than or equal to (or greater than) the fourth threshold, the priority of the uplink signal is higher than the priority of the sidelink signal.

The fourth threshold may be the same as or different from the second threshold. For example, the second threshold is applicable to all data information types, or for the fourth threshold, different data information types may correspond to different threshold values. A value of the fourth threshold may be a positive integer, an integer, or another real number.

For example, a value of a fourth threshold for first-type data information may be PD1, a value of a fourth threshold for second-type data information may be PD2, a value of a fourth threshold for third-type data information may be PD3, and so on. Values of PD1, PD2, and PD3 may be the same or different.

For example, when the uplink signal and the sidelink information both include first-type data information, if a priority of the first-type data information corresponding to the sidelink information is less than (or less than or equal to) PD1, the priority of the sidelink signal is higher than the priority of the uplink signal. Alternatively, if a priority of the first-type data information corresponding to the sidelink information is greater than or equal to (or greater than) PD1, the priority of the uplink signal is higher than the priority of the sidelink signal.

For example, when the uplink signal and the sidelink information both include second-type data information, if a priority of the second-type data information corresponding to the sidelink information is less than (or less than or equal to) PD2, the priority of the sidelink signal is higher than the priority of the uplink signal. Alternatively, if a priority of the second-type data information corresponding to the sidelink information is greater than or equal to (or greater than) PD2, the priority of the uplink signal is higher than the priority of the sidelink signal.

For example, when the uplink signal and the sidelink information both include third-type data information, if a priority of the third-type data information corresponding to the sidelink information is less than (or less than or equal to) PD3, the priority of the sidelink signal is higher than the priority of the uplink signal. Alternatively, if a priority of the third-type data information corresponding to the sidelink information is greater than or equal to (or greater than) PD3, the priority of the uplink signal is higher than the priority of the sidelink signal.

It should be noted that the third threshold and the fourth threshold in the foregoing examples may be predefined, or indicated by the network device.

Example 3

The priorities of the uplink signal and the sidelink signal are determined based on a preset priority of feedback information. For example, a priority of one type of feedback information is predefined, and the priorities of the uplink signal and the sidelink signal are determined based on the priority of the feedback information. Alternatively, priorities of a plurality of types of feedback information are predefined, and the network device may indicate a priority of one type of feedback information, and the priorities of the uplink signal and the sidelink signal are determined based on the priority of the feedback information that is indicated by the network device.

For example, priorities of four types of feedback information may be predefined, which are respectively:
(1) PSFCH (HARQ)>PSFCH (CSI)>PUCCH (HARQ)>PUCCH (CSI);
(2) PUCCH (HARQ)>PUCCH (CSI)>PSFCH (HARQ)>PSFCH (CSI);
(3) PSFCH (HARQ)>PUCCH (HARQ)>PSFCH (CSI)>PUCCH (CSI); and
(4) PUCCH (HARQ)>PSFCH (HARQ)>PUCCH (CSI)>PSFCH (CSI).

It should be noted that "channel (information or signal)" in an embodiment of the application means that the information or the signal is transmitted on the corresponding channel. For example, PSFCH (HARQ) means that a HARQ signal is transmitted on a PSFCH channel. "First channel">"second channel" means that when the first signal is transmitted on the first channel, a priority of the first signal is higher than that of the second signal transmitted on the second channel. For example, PSFCH (HARQ)>PSFCH (CSI) means that a priority of a HARQ transmitted on a PSFCH channel is higher than a priority of CSI transmitted on the PSFCH channel.

If the network device indicates the priority of the feedback information in the first case, that is, (1), the priorities of the uplink signal and the sidelink signal may be determined based on the priority of the feedback information. For example, if the sidelink feedback signal includes a HARQ, the HARQ is transmitted on a PSFCH, the uplink signal includes CSI, and the CSI is transmitted on a PUCCH, it may be determined, based on the priority of the feedback information in (1), that a priority of the HARQ on the PSFCH is higher than a priority of the CSI on the PUCCH, and it may be determined that the priority of the sidelink signal is higher than the priority of the uplink signal. A process of determining the priorities of the uplink signal and the sidelink signal based on the priority of the feedback information in each of (2) to (4) is similar to the foregoing process, and is not described herein again.

It should be noted that the sidelink feedback signal (sidelink feedback information, SFI) may include a HARQ and/or CSI, and the HARQ and/or CSI may be transmitted on the PSFCH, or may be transmitted on a PSSCH. A case in which the HARQ and/or the CSI are/is transmitted on the PSSCH may be referred to as a PSSCH (with SFI). For example, if the HARQ is transmitted on the PSSCH, a priority of a PSSCH (HARQ) may be the same as a priority of a PSFCH (HARQ), and if the CSI is transmitted on the PSSCH, a priority of a PSSCH (CSI) may be the same as a priority of a PSFCH (CSI). For example, a priority of the PSSCH (with SFI) may alternatively be less than a priority of the PSFCH. For example, a priority of a PSFCH (HARQ) is higher than a priority of a PSFCH (CSI), and the priority of the PSFCH (CSI) is higher than a priority of a PSSCH (with UCI).

It should be noted that the uplink control information (UCI) may include a HARQ and/or CSI, and the HARQ and/or the CSI may be transmitted on the PUCCH, or may be transmitted on the PUSCH. A case in which the HARQ and/or the CSI are/is transmitted on the PUSCH may be referred to as a PUSCH (with UCI). For example, if the HARQ is transmitted on the PUSCH, a priority of a PUSCH (HARQ) may be the same as a priority of a PUCCH (HARQ), and if the CSI is transmitted on the PUSCH, a priority of a PUSCH (CSI) may be the same as a priority of a PUCCH (CSI). For example, a priority of the PUSCH (with UCI) may alternatively be less than a priority of the PUCCH. For example, a priority of a PUCCH (HARQ) is higher than a priority of a PUCCH (CSI), and the priority of the PUCCH (CSI) is higher than a priority of a PUSCH (with UCI).

The first transmit power of the uplink signal and the second transmit power of the sidelink signal may be further determined in S401 based on the priorities of the uplink signal and the sidelink signal that are determined in the example.

Example 4

The network device may indicate the priorities of the sidelink signal and the uplink signal to the terminal device. Correspondingly, the terminal device may determine the priorities of the sidelink signal and the uplink signal based on the indication of the network device. When the sidelink feedback signal includes a plurality of pieces of feedback information, and/or the uplink signal includes a plurality of feedback signals, priorities of different feedback signals may be determined in the following manners. Power control is performed based on priorities of different feedback signals. For example, if the sidelink signal includes a HARQ and CSI, and the uplink signal includes CSI, priorities of different feedback signals are: sidelink signal (HARQ)>sidelink feedback signal (CSI)>uplink signal (CSI). In this case, the terminal device may preferentially ensure transmission of the sidelink signal (HARQ), then preferentially ensure transmission of the sidelink signal (CSI), and finally ensure transmission of the uplink signal (CSI).

For example, if a priority of sidelink transmission is higher than a priority of uplink transmission, priorities of different feedback information may be:

PSFCH (HARQ)>PSFCH (CSI)>PUCCH (HARQ)>PUCCH (CSI).

Alternatively, if a priority of uplink transmission is higher than a priority of sidelink transmission, priorities of different feedback information may be:

PUCCH (HARQ)>PUCCH (CSI)>PSFCH (HARQ)>PSFCH (CSI).

Alternatively, if a priority of sidelink transmission is higher than a priority of uplink transmission, and a priority of a HARQ is higher than a priority of CSI, priorities of different feedback information may be:

PSFCH (HARQ)>PUCCH (HARQ)>PSFCH (CSI)>PUCCH (CSI).

Alternatively, if a priority of uplink transmission is higher than a priority of sidelink transmission, and a priority of a HARQ is higher than a priority of CSI, priorities of different feedback information may be:

PUCCH (HARQ)>PSFCH (HARQ)>PUCCH (CSI)>PSFCH (CSI).

It should be noted that the sidelink feedback signal (sidelink feedback information, SFI) may include a HARQ and/or CSI, and the HARQ and/or CSI may be transmitted on the PSFCH, or may be transmitted on the PSSCH. A case in which the HARQ and/or the CSI are/is transmitted on the PSSCH may be referred to as a PSSCH (with SFI). For example, if the HARQ is transmitted on the PSSCH, a priority of a PSSCH (HARQ) may be the same as a priority of a PSFCH (HARQ), and if the CSI is transmitted on the PSSCH, a priority of a PSSCH (CSI) may be the same as a priority of a PSFCH (CSI). For example, a priority of the PSSCH (with SFI) may alternatively be less than a priority of the PSFCH. For example, a priority of a PSFCH (HARQ) is higher than a priority of a PSFCH (CSI), and the priority of the PSFCH (CSI) is higher than a priority of a PSSCH (with UCI).

It should be noted that the uplink control information (UCI) may include a HARQ and/or CSI, and the HARQ and/or the CSI may be transmitted on the PUCCH, or may be transmitted on the PUSCH. A case in which the HARQ and/or the CSI are/is transmitted on the PUSCH may be referred to as a PUSCH (with UCI). For example, if the HARQ is transmitted on the PUSCH, a priority of a PUSCH (HARQ) may be the same as a priority of a PUCCH (HARQ), and if the CSI is transmitted on the PUSCH, a priority of a PUSCH (CSI) may be the same as a priority of a PUCCH (CSI). For example, a priority of the PUSCH (with UCI) may alternatively be less than a priority of the PUCCH. For example, a priority of a PUCCH (HARQ) is higher than a priority of a PUCCH (CSI), and the priority of the PUCCH (CSI) is higher than a priority of a PUSCH (with UCI).

It should be noted that the priorities of the different feedback signals may be configured by the network device, or may be predefined. This is not limited in this application. Further, the priorities of the CSI and the HARQ information may be configured by the network device. For example, the network device may separately indicate the priority of the CSI and the priority of the HARQ information. Alternatively, the priorities of the CSI and the HARQ information may be predefined in a protocol. This is not limited in this application.

The first transmit power of the uplink signal and the second transmit power of the sidelink signal may be further determined in S401 based on the priorities of the uplink signal and the sidelink signal that are determined in the example.

Example 5

The solution provided in an embodiment of the application may be applied to a carrier aggregation (CA) scenario. For example, CA may include a primary cell (PCell) and a secondary cell (SCell). The first terminal device may determine the priorities of the uplink signal and the sidelink signal based on priorities of the primary cell and the secondary cell.

For example, when the priority of the primary cell is higher than the priority of the secondary cell, if the primary cell is used to transmit the uplink signal, and the secondary cell is used to transmit the sidelink signal, the priority of the uplink signal is higher than the priority of the sidelink signal. Similarly, if the primary cell is used to transmit the sidelink signal, and the secondary cell is used to transmit the uplink signal, the priority of the sidelink signal is higher than the priority of the uplink signal.

For another example, in an embodiment of the application, a priority may be determined with reference to a cell identifier. For example, a priority for a smaller cell identifier is higher than a priority for a larger cell identifier. If the uplink signal is transmitted in a cell with a smaller cell identifier, and the sidelink signal is transmitted in a cell with a larger cell identifier, the priority of the uplink signal is higher than the priority of the sidelink signal. Similarly, if the sidelink signal is transmitted in a cell with a smaller cell identifier, and the uplink signal is transmitted in a cell with a larger cell identifier, the priority of the sidelink signal is higher than the priority of the uplink signal.

It may be understood that, in this example, for how to transmit the uplink signal and the sidelink signal after the priorities of the uplink signal and the sidelink signal are determined, refer to the records of the procedure shown in FIG. 4A and FIG. 4B. Details are not described herein again.

Example 6

The solution provided in an embodiment of the application may be applied to a dual-connectivity (DC) scenario. For example, for the DC scenario, cells of the terminal device may include a master cell group (MCG) and a secondary cell group (SCG). A primary cell in the master cell group is referred to as a primary cell PCell, and a remaining cell is a secondary cell SCell. A primary cell in the secondary cell group is referred to as a primary secondary cell (PSCell), and a remaining cell is a secondary cell SCell.

For example, when a priority of the primary cell PCell is higher than a priority of the primary secondary cell PSCell, and a priority of the primary secondary cell PSCell is higher than a priority of the secondary cell S Cell, if the primary cell is used to transmit the uplink signal, and the primary secondary cell and the secondary cell are used to transmit the sidelink signal, the priority of the uplink signal is higher than the priority of the sidelink signal. If the primary cell is used to transmit the sidelink signal, and the primary secondary cell and the secondary cell are used to transmit the uplink signal, the priority of the sidelink signal is higher than the priority of the uplink signal.

In the foregoing DC scenario, a case in which a PUCCH may be configured for some cells, and a PUCCH may not be configured for some cells. In this case, the priorities of the uplink signal and the sidelink signal may be determined depending on whether a PUCCH is configured for the cell. For example, a PUCCH is configured for a first cell, a PUCCH is not configured for a second cell, and a priority of the first cell is higher than a priority of the second cell. If the first cell is used to transmit the uplink signal, and the second cell is used to transmit the sidelink signal, the priority of the uplink signal is higher than the priority of the sidelink signal. If the first cell is used to transmit the sidelink signal, and the second cell is used to transmit the uplink signal, the priority of the sidelink signal is higher than the priority of the uplink signal.

It may be understood that, in this example, for how to transmit the uplink signal and the sidelink signal after the priorities of the uplink signal and the sidelink signal are determined, refer to the records of the procedure shown in FIG. 4A and FIG. 4B. Details are not described herein again.

It should be noted that, in the embodiments of this application, different embodiments may be used independently or in combination with each other, which does not limit a use scope of the different embodiments.

In the embodiments provided in this application, the method provided in the embodiments of this application is described from perspectives of the network device, the terminal, and interaction between the network device and the terminal. To implement the foregoing functions in the method provided in the embodiments of this application, the network device and the terminal may include a hardware structure and/or a software module, to implement the foregoing functions in a form of the hardware structure, the software module, or a combination of the hardware structure and the software module. Whether a function in the foregoing functions is performed by the hardware structure, the software module, or the combination of the hardware structure and the software module depends on the application and a design constraint condition of the technical solutions.

Figure 7:
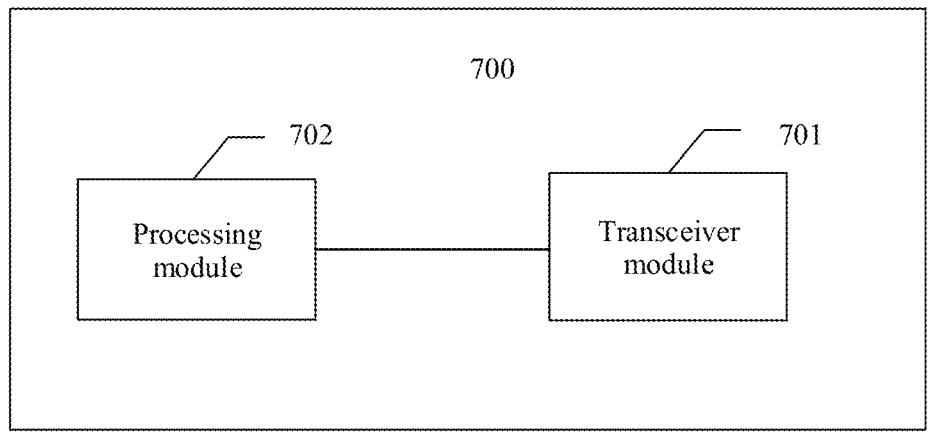
FIG. 7 is a schematic structural diagram of an apparatus according to an embodiment of this application.

Same as the foregoing concept, as shown in FIG. 7, an embodiment of this application further provides an apparatus 700. The apparatus 700 includes a transceiver module 701 and a processing module 702.

In an example, the apparatus 700 is configured to implement a function of the first terminal device in the foregoing method. The apparatus may be the first terminal device, or may be an apparatus in the first terminal device. The apparatus may be a chip system. In an embodiment of the application, the chip system may include a chip, or may include a chip and another discrete component.

The processing module 702 is configured to: when a first terminal device supports sending of an uplink signal and a sidelink signal in a first time unit on a first carrier, determine, based on priorities of the uplink signal and the sidelink signal, a first transmit power of the uplink signal and a second transmit power of the sidelink signal. The transceiver module 701 is configured to send the uplink signal based on the first transmit power, and/or send the sidelink signal based on the second transmit power.

In an example, the apparatus 700 is configured to implement a function of the second terminal device in the foregoing method. The apparatus may be the second terminal device, or may be an apparatus in the second terminal device. The apparatus may be a chip system. In an embodiment of the application, the chip system may include a chip, or may include a chip and another discrete component.

The transceiver module 701 is configured to receive a sidelink signal. The processing module 702 is configured to process the sidelink signal.

In an example, the apparatus 700 is configured to implement a function of the network device in the foregoing method. The apparatus may be the network device, or may be an apparatus in the network device. The apparatus may be a chip system. In an embodiment of the application, the chip system may include a chip, or may include a chip and another discrete component.

The transceiver module 701 is configured to receive an uplink signal. The processing module 702 is configured to process the uplink signal.

For execution processes of the processing module 702 and the transceiver module 701, refer to the records in the foregoing method embodiment. Division into modules in an embodiment of the application is an example, is merely logical function division, and may be other division during an embodiment. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 8:
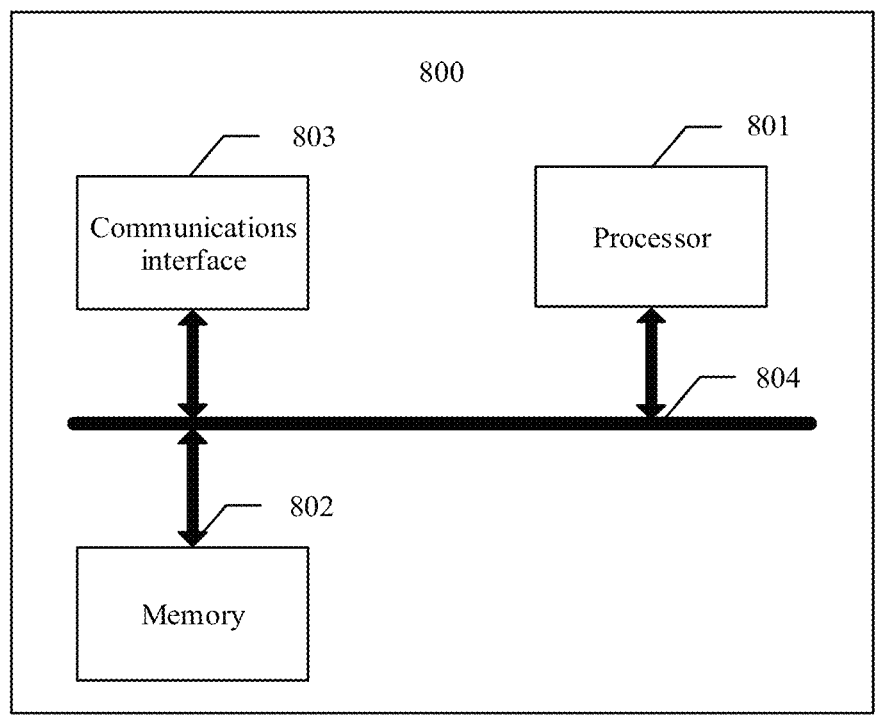
FIG. 8 is a schematic structural diagram of an apparatus according to an embodiment of this application.

Same as the foregoing concept, as shown in FIG. 8, an embodiment of this application further provides an apparatus 800.

In an example, the apparatus 800 is configured to implement a function of the first terminal device in the foregoing method. The apparatus may be the terminal device, or may be an apparatus in the terminal device. The apparatus 800 includes at least one processor 801, configured to implement a function of the first terminal device in the foregoing method. For example, when sending of an uplink signal and a sidelink signal in a first time unit on a first carrier is supported, the processor 801 may determine, based on priorities of the uplink signal and the sidelink signal, a first transmit power of the uplink signal and a second transmit power of the sidelink signal. For details, refer to the detailed descriptions in the method. Details are not described herein again. The apparatus 800 may further include at least one memory 802, configured to store program instructions and/or data. The memory 802 is coupled to the processor 801. Coupling in an embodiment of the application may be indirect coupling or a communication connection between apparatuses, units, or modules in an electrical form, a mechanical form, or another form, and is used for information exchange between the apparatuses, the units, or the modules. In an embodiment, the memory 802 may alternatively be located outside the apparatus 800. The processor 801 may operate in collaboration with the memory 802. The processor 801 may execute the program instructions stored in the memory 802. At least one of the at least one memory may be included in the processor. The apparatus 800 may further include a communications interface 803, configured to communicate with another device through a transmission medium, so that an apparatus in the apparatus 800 can communicate with the another device. For example, the communications interface 803 may be a transceiver, a circuit, a bus, a module, or a communications interface of another type. The another device may be a second terminal device or a network device. The processor 801 sends and receives data through the communications interface 803, and is configured to implement the method in the foregoing embodiments. For example, the communications interface 803 may send the uplink signal based on the first transmit power, and/or send the sidelink signal based on the second transmit power.

In an example, the apparatus 800 is configured to implement a function of the second terminal device in the foregoing method. The apparatus may be the terminal device, or may be an apparatus in the terminal device. At least one processor 801 of the apparatus 800 is configured to implement a function of the second terminal device in the foregoing method. For example, the processor 801 may process a received sidelink signal. For details, refer to the detailed descriptions in the method. Details are not described herein again. The apparatus 800 may further include at least one memory 802, configured to store program instructions and/or data. The memory 802 is coupled to the processor 801. Coupling in an embodiment of the application may be indirect coupling or a communication connection between apparatuses, units, or modules in an electrical form, a mechanical form, or another form, and is used for information exchange between the apparatuses, the units, or the modules. In an embodiment, the memory 802 may alternatively be located outside the apparatus 800. The processor 801 may operate in collaboration with the memory 802. The processor 801 may execute the program instructions stored in the memory 802. At least one of the at least one memory may be included in the processor. The apparatus 800 may further include a communications interface 803, configured to communicate with another device through a transmission medium, so that an apparatus in the apparatus 800 can communicate with the another device. For example, the communications interface 803 may be a transceiver, a circuit, a bus, a module, or a communications interface of another type. The another device may be a first terminal device or a network device. The processor 801 sends and receives data through the communications interface 803, and is configured to implement the method in the foregoing embodiments. For example, the communications interface 803 may receive a sidelink signal.

In an example, the apparatus 800 is configured to implement a function of the network device in the foregoing method. The apparatus may be the network device, or may be an apparatus in the network device. At least one processor 801 of the apparatus 800 is configured to implement a function of the network device in the foregoing method. For example, the processor 801 may process a received uplink signal. For details, refer to the detailed descriptions in the method. Details are not described herein again. The apparatus 800 may further include at least one memory 802, configured to store program instructions and/or data. The memory 802 is coupled to the processor 801. Coupling in an embodiment of the application may be indirect coupling or a communication connection between apparatuses, units, or modules in an electrical form, a mechanical form, or another form, and is used for information exchange between the apparatuses, the units, or the modules. In an embodiment, the memory 802 may alternatively be located outside the apparatus 800. The processor 801 may operate in collaboration with the memory 802. The processor 801 may execute the program instructions stored in the memory 802. At least one of the at least one memory may be included in the processor. The apparatus 800 may further include a communications interface 803, configured to communicate with another device through a transmission medium, so that an apparatus in the apparatus 800 can communicate with the another device. For example, the communications interface 803 may be a transceiver, a circuit, a bus, a module, or a communications interface of another type. The another device may be a first terminal device or a second terminal device. The processor 801 sends and receives data through the communications interface 803, and is configured to implement the method in the foregoing embodiments. For example, the communications interface 803 may receive an uplink signal.

In an embodiment of the application, a connection medium between the communications interface 803, the processor 801, and the memory 802 is not limited. In an embodiment of the application, in FIG. 8, the memory 802, the processor 801, and the communications interface 803 are connected by using a bus 804. The bus is represented by using a thick line in FIG. 8. A connection manner between other components is schematically described, but does not constitute a limitation. The bus may be classified into an address bus, a data bus, a control bus, and the like. For ease of representation, only one thick line is used to represent the bus in FIG. 8, but this does not mean that there is only one bus or only one type of bus.

In an embodiment of the application, the processor may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The general-purpose processor may be a microprocessor or any conventional processor or the like. The operations of the methods disclosed with reference to the embodiments of this application may be directly performed by a hardware processor, or may be performed by using a combination of hardware in the processor and a software module.

In the embodiments of this application, the memory may be a non-volatile memory, for example, a hard disk drive (HDD) or a solid-state drive (SSD); or may be a volatile memory, for example, a random access memory (RAM). The memory is any other medium that can carry or store expected program code in a form of an instruction or a data structure and that can be accessed by a computer, but is not limited thereto. The memory in an embodiment of the application may alternatively be a circuit or any other apparatus that can implement a storage function, and is configured to store program instructions and/or data.

All or a part of the foregoing method in the embodiments of this application may be implemented by using software, hardware, firmware, or any combination thereof. When software is used to implement the embodiments, the embodiments may be implemented in a form of a computer program product. The computer program product includes one or more computer instructions. When the computer program instructions are loaded and executed on a computer, all or some of the procedures or the functions according to the embodiments of the present disclosure are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD for short)), a semiconductor medium (for example, an SSD), or the like.

It is clear that one of ordinary skilled in the art can make various modifications and variations to this application without departing from the scope of this application. In this way, this application is intended to cover these modifications and variations of this application provided that they fall within the scope of the claims of this application and equivalent technologies thereof

What is claimed is:

1. A communication method, comprising:
    when a first terminal device supports sending of an uplink signal and a sidelink signal in a first time unit on a first carrier, determining, by the first terminal device based on priorities of the uplink signal and the sidelink signal, a first transmit power of the uplink signal and a second transmit power of the sidelink signal, wherein that the first terminal device supports sending of the uplink signal and the sidelink signal in the first time unit on the first carrier is determined based on one or more of: a transmit link, a system parameter, a waveform, and an inclusion relationship among a bandwidth of the transmit link, a bandwidth of a first bandwidth part (BWP), or a bandwidth of a second BWP, wherein the first BWP is used to transmit the uplink signal, and wherein the second BWP is used to transmit the sidelink signal; and
    sending, by the first terminal device, the uplink signal based on the first transmit power, or sending the sidelink signal based on the second transmit power.

2. The method according to claim 1, wherein the transmit link comprises a first transmit link and a second transmit link; and that the first terminal device supports sending of the uplink signal and the sidelink signal in the first time unit on the first carrier comprises:
    if the first terminal device supports sending of the uplink signal on the first transmit link and sending of the sidelink signal on the second transmit link, the first terminal device supports sending of the uplink signal and the sidelink signal in the first time unit on the first carrier; or
    if the first terminal device supports sending of the uplink signal on the first transmit link and sending of the sidelink signal on the second transmit link, and a first system parameter of the uplink signal is the same as a second system parameter of the sidelink signal, the first terminal device supports sending of the uplink signal and the sidelink signal in the first time unit on the first carrier; or
    if the first terminal device supports sending of the uplink signal on the first transmit link and sending of the sidelink signal on the second transmit link, and a first waveform of the uplink signal is the same as a second waveform of the sidelink signal, the first terminal device supports sending of the uplink signal and the sidelink signal in the first time unit on the first carrier; or
    if the first terminal device supports sending of the uplink signal on the first transmit link and sending of the sidelink signal on the second transmit link, the first waveform of the uplink signal is the same as the second waveform of the sidelink signal, and the first system parameter of the uplink signal is the same as the second system parameter of the sidelink signal, the first terminal device supports sending of the uplink signal and the sidelink signal in the first time unit on the first carrier.

3. The method according to claim 1, wherein the transmit link comprises a third transmit link; and wherein that the first terminal device supports sending of the uplink signal and the sidelink signal in the first time unit on the first carrier comprises:
    if the first terminal device supports sending of the uplink signal and the sidelink signal on the third transmit link, and a first system parameter of the uplink signal is the same as a second system parameter of the sidelink signal, the first terminal device supports sending of the uplink signal and the sidelink signal in the first time unit on the first carrier; or
    if the first terminal device supports sending of the uplink signal and the sidelink signal on the third transmit link, and a first waveform of the uplink signal is the same as a second waveform of the sidelink signal, the first terminal device supports sending of the uplink signal and the sidelink signal in the first time unit on the first carrier; or
    if the first terminal device supports sending of the uplink signal and the sidelink signal on the third transmit link, the first system parameter of the uplink signal is the same as the second system parameter of the sidelink signal, and the first waveform of the uplink signal is the same as the second waveform of the sidelink signal, the first terminal device supports sending of the uplink signal and the sidelink signal in the first time unit on the first carrier.

4. The method according to claim 1, wherein the inclusion relationship among the bandwidth of the transmit link, the bandwidth of the first BWP, and the bandwidth of the second BWP is a first inclusion relationship or a second inclusion relationship; and
    wherein the first inclusion relationship is that the bandwidth of the transmit link comprises the bandwidth of the first BWP and the bandwidth of the second BWP; and the second inclusion relationship is that the bandwidth of the transmit link comprises the bandwidth of the first BWP and a part of the bandwidth of the second BWP, and the part of the bandwidth of the second BWP comprises a sending resource pool for a sidelink.

5. The method according to claim 1, wherein
    the sidelink signal comprises feedback information, wherein the uplink signal comprises data information, and wherein a priority of the sidelink signal is higher than a priority of the uplink signal; or
    wherein the uplink signal comprises feedback information, wherein the sidelink signal comprises data information, and wherein the priority of the uplink signal is higher than the priority of the sidelink signal; or
    wherein the sidelink signal comprises first feedback information, wherein the uplink signal comprises second feedback information, wherein a priority of the first feedback information in the sidelink signal is less than a first threshold, and wherein the priority of the sidelink signal is higher than the priority of the uplink signal; or
    wherein the sidelink signal comprises the first feedback information, wherein the uplink signal comprises the second feedback information, wherein a priority of the first feedback information in the sidelink signal is greater than or equal to the first threshold, and wherein the priority of the uplink signal is higher than the priority of the sidelink signal; or
    wherein the sidelink signal comprises first data information, wherein the uplink signal comprises second data information, wherein a priority of the first data information in the sidelink signal is less than a second threshold, and wherein the priority of the sidelink signal is higher than the priority of the uplink signal; or wherein the sidelink signal comprises first data information, wherein the uplink signal comprises second data information, wherein a priority of the first data information in the sidelink signal is greater than or equal to the second threshold, and wherein the priority of the uplink signal is higher than the priority of the sidelink signal.

6. A communication method, comprising:

receiving, by a second terminal device, a sidelink signal, wherein a transmit power of the sidelink signal is a second transmit power determined based on priorities of an uplink signal and the sidelink signal when a first terminal device supports sending of the uplink signal and the sidelink signal in a first time unit on a first carrier, that the first terminal device supports sending of the uplink signal and the sidelink signal in the first time unit on the first carrier is determined based on one or more of: a transmit link, a system parameter, a waveform, and an inclusion relationship among a bandwidth of the transmit link, a bandwidth of a first bandwidth part (BWP), or a bandwidth of a second BWP, wherein the first BWP used to transmit the uplink signal, and wherein the second BWP used to transmit the sidelink signal; and processing, by the second terminal device, the sidelink signal.

7. The method according to claim 6, wherein the transmit link comprises a first transmit link and a second transmit link; and that the first terminal device supports sending of the uplink signal and the sidelink signal in the first time unit on the first carrier comprises:

if the first terminal device supports sending of the uplink signal on the first transmit link and sending of the sidelink signal on the second transmit link, the first terminal device supports sending of the uplink signal and the sidelink signal in the first time unit on the first carrier; or if the first terminal device supports sending of the uplink signal on the first transmit link and sending of the sidelink signal on the second transmit link, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal on the first transmit link and sending of the sidelink signal on the second transmit link, and a first waveform of the uplink signal is the same as a second waveform of the sidelink signal, the first terminal device supports sending of the uplink signal and the sidelink signal in the first time unit on the first carrier; or if the first terminal device supports sending of the uplink signal on the first transmit link and sending of the sidelink signal on the second transmit link, the first waveform of the uplink signal is the same as the second waveform of the sidelink signal, and the first system parameter of the uplink signal is the same as the second system parameter of the sidelink signal, the first terminal device supports sending of the uplink signal and the sidelink signal in the first time unit on the first carrier.

8. The method according to claim 6, wherein the transmit link comprises a third transmit link; and wherein that the first terminal device supports sending of the uplink signal and the sidelink signal in the first time unit on the first carrier comprises:

if the first terminal device supports sending of the uplink signal and the sidelink signal on the third transmit link, and a first system parameter of the uplink signal is the same as a second system parameter of the sidelink signal, the first terminal device supports sending of the uplink signal and the sidelink signal in the first time unit on the first carrier; or if the first terminal device supports sending of the uplink signal and the sidelink signal on the third transmit link, and a first waveform of the uplink signal is the same as a second waveform of the sidelink signal, the first terminal device supports sending of the uplink signal and the sidelink signal in the first time unit on the first carrier; or if the first terminal device supports sending of the uplink signal and the sidelink signal on the third transmit link, the first system parameter of the uplink signal is the same as the second system parameter of the sidelink signal, and the first waveform of the uplink signal is the same as the second waveform of the sidelink signal, the first terminal device supports sending of the uplink signal and the sidelink signal in the first time unit on the first carrier.

9. The method according to claim 6, wherein the inclusion relationship among the bandwidth of the transmit link, the bandwidth of the first BWP, and the bandwidth of the second BWP is a first inclusion relationship or a second inclusion relationship; and wherein the first inclusion relationship is that the bandwidth of the transmit link comprises the bandwidth of the first BWP and the bandwidth of the second BWP; and the second inclusion relationship is that the bandwidth of the transmit link comprises the bandwidth of the first BWP and a part of the bandwidth of the second BWP, and the part of the bandwidth of the second BWP comprises a sending resource pool for a sidelink.

10. The method according to claim 6, wherein the sidelink signal comprises feedback information, wherein the uplink signal comprises data information, and wherein a priority of the sidelink signal is higher than a priority of the uplink signal; or wherein the uplink signal comprises feedback information, wherein the sidelink signal comprises data information, and the priority of the uplink signal is higher than the priority of the sidelink signal; or wherein the sidelink signal comprises feedback information, wherein the uplink signal comprises feedback information, wherein a priority of the feedback information in the sidelink signal is less than a first threshold, and wherein the priority of the sidelink signal is higher than the priority of the uplink signal; or wherein the sidelink signal comprises feedback information, wherein the uplink signal comprises feedback information, a priority of the feedback information in the sidelink signal is greater than or equal to the first threshold, and wherein the priority of the uplink signal is higher than the priority of the sidelink signal; or wherein the sidelink signal comprises data information, wherein the uplink signal comprises data information, wherein a priority of the data information in the sidelink signal is less than a second threshold, and wherein the priority of the sidelink signal is higher than the priority of the uplink signal; or wherein the sidelink signal comprises data information, wherein the uplink signal comprises data information, wherein a priority of the data information in the sidelink signal is greater than or equal to the second threshold, and wherein the priority of the uplink signal is higher than the priority of the sidelink signal.

11. A first device, comprising:
a memory storing instructions; and
a processor coupled to the memory to execute the instructions to:
when the first device supports sending of an uplink signal and a sidelink signal in a first time unit on a first carrier, determine, based on priorities of the uplink signal and the sidelink signal, a first transmit power of the uplink signal and a second transmit power of the sidelink signal, wherein that the first device supports sending of the uplink signal and the sidelink signal in the first time unit on the first carrier is determined based on one or more of: a transmit link, a system parameter, a waveform, and an inclusion relationship among a bandwidth of the transmit link, a bandwidth of a first bandwidth part (BWP), or a bandwidth of a second BWP, wherein the first BWP is used to transmit the uplink signal, and wherein the second BWP is used to transmit the sidelink signal; and
send the uplink signal based on the first transmit power, or sending the sidelink signal based on the second transmit power.

12. The first device according to claim 11, wherein the transmit link comprises a first transmit link and a second transmit link; and that the first device supports sending of the uplink signal and the sidelink signal in the first time unit on the first carrier comprises:
if the first device supports sending of the uplink signal on the first transmit link and sending of the sidelink signal on the second transmit link, the first device supports sending of the uplink signal and the sidelink signal in the first time unit on the first carrier; or
if the first device supports sending of the uplink signal on the first transmit link and sending of the sidelink signal on the second transmit link, and a first system parameter of the uplink signal is the same as a second system parameter of the sidelink signal, the first device supports sending of the uplink signal and the sidelink signal in the first time unit on the first carrier; or
if the first device supports sending of the uplink signal on the first transmit link and sending of the sidelink signal on the second transmit link, and a first waveform of the uplink signal is the same as a second waveform of the sidelink signal, the first device supports sending of the uplink signal and the sidelink signal in the first time unit on the first carrier; or
if the first device supports sending of the uplink signal on the first transmit link and sending of the sidelink signal on the second transmit link, the first waveform of the uplink signal is the same as the second waveform of the sidelink signal, and the first system parameter of the uplink signal is the same as the second system parameter of the sidelink signal, the first device supports sending of the uplink signal and the sidelink signal in the first time unit on the first carrier.

13. The first device according to claim 11, wherein the transmit link comprises a third transmit link; and wherein that the first device supports sending of the uplink signal and the sidelink signal in the first time unit on the first carrier comprises:
if the first device supports sending of the uplink signal and the sidelink signal on the third transmit link, and a first system parameter of the uplink signal is the same as a second system parameter of the sidelink signal, the first device supports sending of the uplink signal and the sidelink signal in the first time unit on the first carrier; or
if the first device supports sending of the uplink signal and the sidelink signal on the third transmit link, and a first waveform of the uplink signal is the same as a second waveform of the sidelink signal, the first device supports sending of the uplink signal and the sidelink signal in the first time unit on the first carrier; or
if the first device supports sending of the uplink signal and the sidelink signal on the third transmit link, the first system parameter of the uplink signal is the same as the second system parameter of the sidelink signal, and the first waveform of the uplink signal is the same as the second waveform of the sidelink signal, the first device supports sending of the uplink signal and the sidelink signal in the first time unit on the first carrier.

14. The first device according to claim 11, wherein the inclusion relationship among the bandwidth of the transmit link, the bandwidth of the first BWP, and the bandwidth of the second BWP is a first inclusion relationship or a second inclusion relationship; and
wherein the first inclusion relationship is that the bandwidth of the transmit link comprises the bandwidth of the first BWP and the bandwidth of the second BWP; and the second inclusion relationship is that the bandwidth of the transmit link comprises the bandwidth of the first BWP and a part of the bandwidth of the second BWP, and the part of the bandwidth of the second BWP comprises a sending resource pool for a sidelink.

15. The first device according to claim 11, wherein
the sidelink signal comprises feedback information, wherein the uplink signal comprises data information, and wherein a priority of the sidelink signal is higher than a priority of the uplink signal; or
wherein the uplink signal comprises feedback information, wherein the sidelink signal comprises data information, and wherein the priority of the uplink signal is higher than the priority of the sidelink signal; or
wherein the sidelink signal comprises first feedback information, wherein the uplink signal comprises second feedback information, wherein a priority of the first feedback information in the sidelink signal is less than a first threshold, and wherein the priority of the sidelink signal is higher than the priority of the uplink signal; or
wherein the sidelink signal comprises the first feedback information, wherein the uplink signal comprises the second feedback information, wherein a priority of the first feedback information in the sidelink signal is greater than or equal to the first threshold, and wherein the priority of the uplink signal is higher than the priority of the sidelink signal; or
wherein the sidelink signal comprises first data information, wherein the uplink signal comprises second data information, wherein a priority of the first data information in the sidelink signal is less than a second threshold, and wherein the priority of the sidelink signal is higher than the priority of the uplink signal; or
wherein the sidelink signal comprises first data information, wherein the uplink signal comprises second data information, wherein a priority of the first data information in the sidelink signal is greater than or equal to the second threshold, and wherein the priority of the uplink signal is higher than the priority of the sidelink signal.

16. A second device, comprising:
a memory storing instructions; and
a processor coupled to the memory to execute the instructions to:
receive a sidelink signal, wherein a transmit power of the sidelink signal is a second transmit power determined based on priorities of an uplink signal and the sidelink signal when a first terminal device supports sending of the uplink signal and the sidelink signal in a first time unit on a first carrier, that a first device supports sending of the uplink signal and the sidelink signal in the first time unit on the first carrier is determined based on one or more of: a transmit link, a system parameter, a waveform, and an inclusion relationship among a bandwidth of the transmit link, a bandwidth of a first bandwidth part (BWP), or a bandwidth of a second BWP, wherein the first BWP is used to transmit the uplink signal, and wherein the second BWP is used to transmit the sidelink signal; and
process the sidelink signal.

17. The second device according to claim 16, wherein the transmit link comprises a first transmit link and a second transmit link; and that the first device supports sending of the uplink signal and the sidelink signal in the first time unit on the first carrier comprises:
if the first device supports sending of the uplink signal on the first transmit link and sending of the sidelink signal on the second transmit link, the first device supports sending of the uplink signal and the sidelink signal in the first time unit on the first carrier; or
if the first device supports sending of the uplink signal on the first transmit link and sending of the sidelink signal on the second transmit link, and a first system parameter of the uplink signal is the same as a second system parameter of the sidelink signal, the first device supports sending of the uplink signal and the sidelink signal in the first time unit on the first carrier; or
if the first device supports sending of the uplink signal on the first transmit link and sending of the sidelink signal on the second transmit link, and a first waveform of the uplink signal is the same as a second waveform of the sidelink signal, the first device supports sending of the uplink signal and the sidelink signal in the first time unit on the first carrier; or
if the first device supports sending of the uplink signal on the first transmit link and sending of the sidelink signal on the second transmit link, the first waveform of the uplink signal is the same as the second waveform of the sidelink signal, and the first system parameter of the uplink signal is the same as the second system parameter of the sidelink signal, the first device supports sending of the uplink signal and the sidelink signal in the first time unit on the first carrier.

18. The second device according to claim 16, wherein the transmit link comprises a third transmit link; and wherein that the first device supports sending of the uplink signal and the sidelink signal in the first time unit on the first carrier comprises:
if the first device supports sending of the uplink signal and the sidelink signal on the third transmit link, and a first system parameter of the uplink signal is the same as a second system parameter of the sidelink signal, the first device supports sending of the uplink signal and the sidelink signal in the first time unit on the first carrier; or
if the first device supports sending of the uplink signal and the sidelink signal on the third transmit link, and a first waveform of the uplink signal is the same as a second waveform of the sidelink signal, the first device supports sending of the uplink signal and the sidelink signal in the first time unit on the first carrier; or
if the first device supports sending of the uplink signal and the sidelink signal on the third transmit link, the first system parameter of the uplink signal is the same as the second system parameter of the sidelink signal, and the first waveform of the uplink signal is the same as the second waveform of the sidelink signal, the first device supports sending of the uplink signal and the sidelink signal in the first time unit on the first carrier.

19. The second device according to claim 16, wherein the inclusion relationship among the bandwidth of the transmit link, the bandwidth of the first BWP, and the bandwidth of the second BWP is a first inclusion relationship or a second inclusion relationship; and
wherein the first inclusion relationship is that the bandwidth of the transmit link comprises the bandwidth of the first BWP and the bandwidth of the second BWP; and wherein the second inclusion relationship is that the bandwidth of the transmit link comprises the bandwidth of the first BWP and a part of the bandwidth of the second BWP, and the part of the bandwidth of the second BWP comprises a sending resource pool for a sidelink.

20. The second device according to claim 16, wherein
the sidelink signal comprises feedback information, wherein the uplink signal comprises data information, and wherein a priority of the sidelink signal is higher than a priority of the uplink signal; or
wherein the uplink signal comprises feedback information, wherein the sidelink signal comprises data information, and wherein the priority of the uplink signal is higher than the priority of the sidelink signal; or
wherein the sidelink signal comprises feedback information, wherein the uplink signal comprises feedback information, wherein a priority of the feedback information in the sidelink signal is less than a first threshold, and wherein the priority of the sidelink signal is higher than the priority of the uplink signal; or
wherein the sidelink signal comprises feedback information, wherein the uplink signal comprises feedback information, a priority of the feedback information in the sidelink signal is greater than or equal to the first threshold, and wherein the priority of the uplink signal is higher than the priority of the sidelink signal; or
wherein the sidelink signal comprises data information, wherein the uplink signal comprises data information, wherein a priority of the data information in the sidelink signal is less than a second threshold, and wherein the priority of the sidelink signal is higher than the priority of the uplink signal; or
wherein the sidelink signal comprises data information, wherein the uplink signal comprises data information, wherein a priority of the data information in the sidelink signal is greater than or equal to the second threshold, and wherein the priority of the uplink signal is higher than the priority of the sidelink signal.

* * * * *